US00RE41726E

(19) United States
(12) Reissued Patent
Belliveau

(10) Patent Number: US RE41,726 E
(45) Date of Reissued Patent: Sep. 21, 2010

(54) METHOD AND APPARATUS FOR CONTROLLING THE TEMPERATURE OF A MULTIPARAMETER LIGHT AND/OR A COMPONENT THEREOF USING ORIENTATION AND/OR PARAMETER INFORMATION

(76) Inventor: Richard S. Belliveau, 10643 Floral Park Dr., Austin, TX (US) 78759

(21) Appl. No.: 11/256,623
(22) Filed: Oct. 21, 2005

Related U.S. Patent Documents

Reissue of:
(64) Patent No.: 6,635,999
Issued: Oct. 21, 2003
Appl. No.: 09/877,699
Filed: Jun. 8, 2001

(51) Int. Cl.
*H01J 13/32* (2006.01)
*H05B 37/02* (2006.01)
*G03B 21/20* (2006.01)
*G03B 21/14* (2006.01)

(52) U.S. Cl. ..... 315/112; 315/309; 353/87; 353/88

(58) Field of Classification Search ..... 353/85, 353/87, 88, 89, 119; 315/312, 316, 324, 149, 315/150, 156, 291, 307, 308, 309, 32, 50, 315/112; 362/321, 335, 341, 345, 362, 373
See application file for complete search history.

(56) References Cited

U.S. PATENT DOCUMENTS

| | | | | |
|---|---|---|---|---|
| 4,392,187 | A | 7/1983 | Bornhorst | |
| 4,697,227 | A * | 9/1987 | Callahan | 362/233 |
| 5,351,106 | A | 9/1994 | Lesko et al. | |
| 5,367,444 | A | 11/1994 | Bornhorst et al. | |
| 5,515,254 | A | 5/1996 | Smith et al. | |
| 5,788,365 | A | 8/1998 | Hunt et al. | |
| 6,249,092 | B1 * | 6/2001 | Kanatani | 315/316 |
| 6,331,756 | B1 * | 12/2001 | Belliveau | 315/316 |
| 6,621,239 | B1 * | 9/2003 | Belliveau | 315/312 |

OTHER PUBLICATIONS

High End Systems, Inc., x.Spot User Manual, Version 1.0, Feb. 2001 (96 pages).
U.S. Appl. No. 60/280,613, filed Mar. 29, 2001, Belliveau.
High End Systems, Inc., High End Systems On–Line Product Catalog: Cyberlight (www.highend.com/products/Cyberlight/cyb.html & cybfeat.html & cybspec.html & ps_cyber.html), Feb. 7, 2000 (9 pages).
High End Systems, Inc., High End Systems On–Line Product Catalog: Studio Color 575 (www.highend.com/products/studiocolor575/studiocolor.html & /scolfeat.html &/scolspec.html & ps_stcolor575.html), Jan. 20, 2000 (9 pages).
High End Systems, Inc., X.Spot Xtreme, Brochure, 2003 (2 pages).
MicroStain Inc., Corporate History, http://www.microstrain.com/corphist.html, printed May 11, 2001 (1 page).
MicroStrain Inc., 3DM Solid State 3–axis Pitch, Roll, & Yaw Sensor, http://www.microstrain.com/3DM.html, printed May 11, 2001 (4 pages).
U.S. Appl. 09/524,290, filed Mar. 14, 200, Belliveau.

* cited by examiner

*Primary Examiner*—Thuy Vinh Tran
(74) *Attorney, Agent, or Firm*—Walter J. Tencza, Jr.

(57) ABSTRACT

A multiparameter light typically includes a lamp and shutter in combination with one or more optical components, various electrical and mechanical components for operating the optical components, suitable electronics for controlling the parameters of the multiparameter light, and suitable power supplies for the lamp, motors, and electronics. Typically, the lamp is enclosed by the lamp housing, which also contains the other optical components and many of the electrical and mechanical components which operate them. As the lamp and the various components within the lamp housing generate a great deal of heat and as components within the multiparameter light can overheat as a result of various orientations and light makeup parameters, the temperature of components within the lamp housing is managed by controlling the amount of power furnished to the lamp or the amount of light transmitted through the shutter in accordance with the orientation of the multiparameter light and/or the light makeup parameter in use.

132 Claims, 11 Drawing Sheets

METHOD AND APPARATUS FOR CONTROLLING THE TEMPERATURE OF A MULTIPARAMETER LIGHT AND/OR A COMPONENT THEREOF USING ORIENTATION AND/OR PARAMETER INFORMATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to theatre lighting, and more particularly to controlling the temperature of lighting devices such as multiparameter lights that include electrical, optical and electromechanical components, using orientation and/or parameter information.

2. Description of Related Art

Theatre lighting devices are useful for many dramatic and entertainment purposes such as, for example, Broadway shows, television programs, rock concerts, restaurants, nightclubs, theme parks, the architectural lighting of restaurants and buildings, and other events. A multiparameter light is a theatre lighting device that includes a light source and one or more effects known as "parameters" that are controllable typically from a remotely located console. For example, U.S. Pat. No. 4,392,187 issued Jul. 5, 1983 to Bohnhorst and entitled "Computer controlled lighting system having automatically variable position, color, intensity and beam divergence" describes multiparameter lights and a central control system, or central controller. Modem multiparameter lights typically offer many different parameters, including orientation parameters such as pan and tilt, and light makeup parameters that affect the makeup of the light exiting the multiparameter light such as, for example, color, pattern, dimming, iris, focus and zoom.

A multiparameter light typically employs a light source such as a high intensity lamp as well as motors and other motion components which provide the automation to the parameters. These components are typically mounted inside of a lamp housing and generate large amounts of heat inside of the lamp housing, so that cooling by convection or forced air is required. The high intensity lamp generates the greatest amount of heat, and lamps provided by different manufactures may have differences in lumens per watt, or may have a spectral distributions that create more energy in the infrared spectrum thus further raising the internal temperature of the multiparameter light. However, motors used to automate the parameters also generate significant amounts of heat. Heat generation by the motors is a function of the number of motors within a lamp housing as well as the usage of the motors. Heat generation increases with increasing numbers of motors and with repetitive use in a high duty cycle. For example, motors within the lamp housing when used repetitively for shows or events that often repeat the change of a parameter may raise the temperature inside of the lamp housing and its components by 5 to 15 degrees Celsius. Various optical components such as lenses, filters, projection patterns, shutters, and an iris diaphragm are used along the light path, which is the path that a light beam from the lamp normally travels within the lamp housing before it is projected from the multiparameter light, to collimate the light and create and focus patterns to be projected. These optical components are selectively moved in and out of the light beam or are controllably varied when in the light beam to vary the attributes of the projected light, and generate varying amounts of heat as they interact with the light beam by reflection or absorption. For example, light collimated, condensed or filtered by the optical components may be reflected back into the lamp housing, the components of the lamp housing, or the lamp itself, causing a rise in temperature of the multiparameter light generally or in particular components thereof. Light may also be absorbed by the optical components when placed in the path of the light beam. As these components absorb the condensed or collimated light, they become heated themselves and can raise the temperature within the lamp housing.

The ambient air temperature to which the instrument is exposed may also raise the internal temperature of the lamp housing from 25 to 40 Celsius. The position of the multiparameter lamp housing also is a factor in the operating temperature, since the position may allow heat to rise in certain areas of the lamp housing. Specific examples of how the position of a multiparameter light and of how optical components in the lamp housing which lie in the path of the light beam to vary the parameters can generate different amounts of heat are shown in FIGS. 1 through 6. FIG. 1 and FIG. 2 show a filter wheel 1 of the type commonly used in multiparameter lights to set various parameters such as, for example, color and pattern; see, e.g., FIGS. 7–10 (elements 48, 49 and 51) for examples of filter wheels inside of multiparameter lights. Filter wheels are also known as color wheels. The filter wheel 1 illustratively contains eight filter positions 2–8, which are selectively rotated into the light beam to create the desired lighting effect. One of the filter positions, here position 2, is blank so that light may pass freely through the filter wheel 1. Various types of filters are suitable for use in the other filter positions 3–8, including reflecting filters such as optical thin film filters, or dichroic filters, which transmit the desired frequency of light and reflect all other frequencies, and absorbing filters such as some dyed glass filters, which transmit the desired frequency of light and absorb other frequencies. The filter wheel 1 (see FIG. 2) is rotated by a motor 10 through a shaft 9.

FIG. 3 is a schematic drawing of a section of a multiparameter light that includes a lamp 17, reflector 16, condensing lens 18, the filter wheel 1, and a focusing lens 14 within a lamp housing 11; see, e.g., FIGS. 7–10 (elements 45, 46 and 47) for examples of a reflector, lamp, and lens combination as used in various types of multiparameter lights. An arrow 12 shows the direction of forced cooling air that flows through the lamp housing (not shown) of the multiparameter light of FIG. 3, and an arrow 13 shows the natural convection current direction, or the direction of rising heat absent forced air conditions, through the lamp housing 11 of the multiparameter light of FIG. 3. The arrows 12 and 13 are parallel, indicating that the lamp housing 11 of FIG. 3 is in a horizontal position. The lamp 17, the reflector 16, and the lens 18 give off significant amounts of absorbed heat as represented by the wavy lines emanating therefrom. However, the heat emanating from the lamp 17, the reflector 16, and the lens 18 is parallel to both the forced air direction 12 and the convection current direction 13 and is effectively removed from the multiparameter light. Light from the lens 18, represented by rays 19 and 20, is unfiltered as it passes through an opening 2 in the filter wheel 1. The configuration of FIG. 3 can be thought of as a reference configuration because it results in low overall heating of the multiparameter light lamp housing.

FIG. 4 is a schematic drawing of the same section of the multiparameter light as shown in FIG. 3, but shows a reflecting filter 3 in the light beam rather than the opening 2 (FIG. 3). The arrow 12 showing the direction of forced cooling air and the arrow 13 showing the natural convection current direction are parallel, indicating that the lamp housing 11 of FIG. 4 is in a horizontal position. Light from the lens 18 is filtered as it passes through the reflecting filter 3 in the filter wheel 1, resulting in a light beam having the desired properties as represented by rays 24 and 26, and reflected light as represented by rays 23 and 25. The reflected light 23 and 25 passes back into the multiparameter light lamp housing, disproportionately increasing the temperatures of some of the internal components such as the lens 18, lamp 17, and reflector 16 relative to their temperatures in a reference operating configuration such as that of FIG. 3. Although heat from the lens 18, lamp 17, and reflector 16, which is represented by the wavy lines emanating therefrom, is parallel to both the forced air direction 12 and the convection current direction 13, more heat is generated inside the lamp housing in the configuration of FIG. 4 than in the configuration of FIG. 3 because of the reflected light. The configuration of FIG. 4 therefore results in somewhat increased heating of the lens 18, lamp 17, and reflector 16, as well as an increase of temperature in the lamp housing.

FIG. 5 is a schematic drawing of the same section of the multiparameter light as shown in FIG. 4, but shows that light from the lens 18, which is represented by rays 24 and 26, is directed in a downward direction rather than a horizontal direction (FIG. 4). The reflected light 23 and 25 passes back into the multiparameter light lamp housing, disproportionately increasing the temperatures of some of the internal components such as the lens 18, lamp 17, and reflector 16 relative to their temperatures in a reference operating configuration such as that of FIG. 3. An arrow 27 shows the direction of forced cooling air, which is traverse to the natural convection current direction as shown by the arrow 13. The convection currents can be as much as 90 degrees relative to the fan cooling currents. The wavy lines emanating from the lens 18, the lamp 17, and the reflector 16 indicate that the convection currents are not entirely dominated by the forced cooling air and cause a disproportionate increase in the temperature of the lens 18 and especially the lamp 17 and the reflector 16 when the light is directed in a downward direction. Moreover, any cooling air currents that might come from the volume of the lamp housing 11 near the lens 14 are blocked by the filter 3. The configuration of FIG. 5 results in greatly increased heating of the lens 18, lamp 17, and reflector 16, as well as an increase of temperature in the lamp housing.

FIG. 6 is a schematic drawing of the same section of the multiparameter light as shown in FIG. 3, but shows an absorbing-type color filter 4 in the light beam rather than the opening 2 (FIG. 3). The arrow 12 showing the direction of forced cooling air and the arrow 13 showing the natural convection current direction are parallel, indicating that the lamp housing 11 of FIG. 6 is in a horizontal position. Light from the lamp 17 and lens 18, which is represented by rays 34 and 38, contains undesirable frequencies which are absorbed by the filter 4, and the desired filtered light, represented by rays 35 and 39, passes freely. The amount of heat from the lens 18, lamp 17, and reflector 16, which is represented by the wavy lines emanating therefrom, is similar to that generated by the configuration of FIG. 3, and is parallel to both the forced air direction 12 and the convection current direction 13 so that it is effectively removed. However, a relatively large amount of heat is generated in the absorbing filter 4, as indicated by the wavy lines emanating therefrom, which could damage the absorbing filter 4 and could also generally raise the temperature inside the lamp housing 11. The configuration of FIG. 6 therefore potentially results in significant heating of the filter 4 and a somewhat increased general heating of some of the other components within the lamp housing 11.

Because of the presence of such substantial amounts of heat, some multiparameter lights are constructed of various high temperature materials. For example, the insulation of the wiring to the lamp may be silicon or Teflon. The lamp housing of the multiparameter light may be constructed of a high temperature polymer, which additionally helps to reduce the weight of the light and is often molded into a pleasing design shape. However, as the heat capacity of even these materials is not infinite, various cooling techniques are used. The most common cooling techniques are convection and forced air cooling. An example of a convection cooled multiparameter light is the model Studio Color® 575 wash fixture, available from High End Systems, Inc. of Austin, Tex., URL www.highend.com. In this type of multiparameter light, the convection cooled lamp housing contains the lamp, motors, optics and mechanical components, and is rotatably attached to a yoke that facilitates pan and tilt. The yoke is rotatably attached to a base, which contains the power supplies and control and communications electronics. The Studio Color 575 wash fixture and some other such products also have the capability of reducing power to the lamp when the shutter is closed for the purpose of extending lamp life. See also U.S. Pat. No. 5,515,254, issued May 7, 1996 to Smith et al. and entitled "Automated color mixing wash luminaire," and U.S. Pat. No. 5,367,444, issued Nov. 22, 1994 to Bohnhorst et al. and entitled "Thermal management techniques for lighting instruments." An example of a forced air cooled multiparameter light is the model Cyberlight® automated luminaire, available from High End Systems, Inc. of Austin, Tex., URL www.highend.com. In this type of multiparameter light, the forced-air cooled lamp housing is stationary and contains all of the necessary operating components, including a positionable reflector to achieve the pan and tilt parameters.

Neither convection cooling nor forced air cooling is entirely satisfactory. Convection cooling is quiet but does not dissipate as much heat as forced air cooling. Forced air cooling typically is achieved with fans which increase the operating noise of the multiparameter light.

A technique found both in forced air cooled multiparameter lights and convection cooled multiparameter lights for dealing with excessive heat in the lamp housing involves the use of a thermal switch to turn off the lamp when the temperature inside of the lamp housing exceeds specification, and then to turn on the lamp when the inside of the lamp housing falls back to a cooler temperature. FIG. 7 is a block diagram of a forced air cooled multiparameter light which has a lamp housing 40. The lamp housing 40 contains various optical components such as a reflector 45, a lamp 46, a condensing lens 47, a shutter 43 (useful for dimming), three filter wheels 48, 49 and 51, an iris diaphragm 50 (motor omitted for clarity), and a focusing lens 52 (motor omitted for clarity). The lamp housing 40 also contains a thermal switch 59, a lamp power supply 44, and a power supply 53 to power the various motors and electronics of the multiparameter light. The electronics 41 within the lamp housing 40 include a communications node for receiving communication signals and commands from a remote console (not shown) to vary the parameters of the multiparameter light, and a microprocessor for operating the various electrical and electromechanical systems of motors and other actuators (not shown for clarity), optical components, motion components, and other components of the multiparameter light, as well as for turning on and off a fan 42 in accordance with the commands. For cooling purposes, air enters the interior of the lamp housing 40 through a intake vent 54, and is drawn through the lamp housing 40 by the fan 42, and exits the lamp housing 40 through the fan 42. The thermal switch 59 is located next to the ventilation exit near the fan 42, and responds to the temperature at that point inside of the lamp housing 40 by opening the line power circuit if the temperature exceeds specification and closing the line power circuit when the temperature falls back into specification. If pan and tilt parameters are desired, a positionable reflector system (not shown) is provided after the focusing lens 52 and typically outside of the housing 40, although the reflector system may be located inside of the housing 40 if desired.

FIG. 8 is a block diagram of a convection cooled multiparameter light which has a lamp housing 55. The lamp housing 55 contains many of the same type of components as the multiparameter light of FIG. 1 (the component values may of course be different). The electronics 56 within the lamp housing 55 include a communications node for receiving communication signals and commands from a remote console (not shown) to vary the parameters of the multiparameter light, and a microprocessor for operating the electromechanical system of motors (not shown for clarity) of the multiparameter light. Air enters the interior of the lamp housing 55 through an intake vent 58 which has cooling fins, and is drawn through the lamp housing 55 by convection currents and exits the lamp housing 55 through an exhaust vent 57 which also has cooling fins. The various cooling fins may be connected to various components in the lamp housing 55 to help dissipate heat from those components. The thermal switch 59 is located next to the ventilation exit near the exhaust vent 57, and responds to the temperature at that point inside of the lamp housing 55 by opening the line power circuit if the temperature exceeds specification and closing the line power circuit when the temperature falls back into specification.

Another technique found in forced air cooled multiparameter lights for reducing the heat generated by the lamp involves the use of a variable speed fan which runs at high speed to provide a great deal of heat dissipation when required but otherwise runs at lower speeds to achieve adequate cooling with reduced fan noise. FIG. 9 is a block diagram of a forced air cooled multiparameter light which has a lamp housing 60. The lamp housing 60 contains many of the same type of components as the multiparameter light of FIG. 7 (the component values may of course be different), except that a thermal switch is not necessarily present in the line voltage circuit. Instead, a thermal sensor 66 monitors the temperature at a point inside of the lamp housing 60 and furnishes the measurements to a sensor interface 65. The sensor interface 65 is part of the electronics within the lamp housing 60, which also include a communications interface 61 for receiving communication signals and commands from a remote console (not shown) to vary the parameters of the multiparameter light, and a microprocessor 62 for operating the electromechanical system of motors (not shown for clarity) of the multiparameter light through a motor control interface 64 and for operating the speed of a variable speed fan 67 through a fan control interface 63. Air enters the interior of the lamp housing 60 through an intake vent 68, and is drawn through the lamp housing 60 by the variable speed fan 67 and exits the lamp housing 60 through the variable speed fan 67. The microprocessor 62 monitors the temperature within the lamp housing 60 and adjusts the speed of the fan 67 to maintain the temperature within the lamp housing 60 within specification. Fan speed may be set by the microprocessor 62 in various ways, such as, for example, by consulting a temperature-to-fan speed ratio table stored in local memory (not shown) to which the microprocessor 62 has access in a manner well known in the art.

If desired, a thermal switch such as the switch 59 (FIG. 7) may be added to the multiparameter light of FIG. 9 to provide protection against overheating when the fan 67 is operating at full speed.

FIG. 10 is a block diagram of a forced air cooled multiparameter light that has the same type of components as the multiparameter light of FIG. 7, but has separate base and lamp housing sections with respective housings 70 and 71. The base housing 70 contains the communications interface 61, the microprocessor 62, the fan control interface 63, the motor control interface 64, the thermal sensor interface 65, the lamp power supply 44, and the motor and electronics power supply 53. The lamp housing 71 contains the thermal sensor 66, the reflector 45, the lamp 46, the condensing lens 47, the shutter 43, the filter wheels 48, 49 and 51, the iris diaphragm 50, and the focusing lens 52. Various wires are run between the base housing 70 and the lamp housing 71 (some wires are omitted for clarity) through a wireway 73, which typically is a flexible conduit or a pathway between the bearings used to attach the lamp housing 71 to the base housing 70 on pan and tilt lights. Air enters the interior of the lamp housing 71 through an intake vent 74, and is drawn through the lamp housing 71 by the variable speed fan 72 and exits the lamp housing 71 through the variable speed fan 72. The microprocessor 62 monitors the temperature within the lamp housing 71 and adjusts the speed of the fan 72 to maintain the temperature inside of the lamp housing 71 within specification.

In the multiparameter lights of FIGS. 9 and 10, an electronic circuit controls the fan speed in accordance with signals from a thermal sensor. As the temperature inside of the lamp housing rises, the sensor provides a signal to the electronic circuit that in turn increases the speed of the fan. This increased fan speed provides greater airflow and in turn lowers the temperature of the lamp housing and the components contained therein. While effective for temperature control, this solution is disadvantageous in settings where the ambient temperature is high and a high noise level is not acceptable. Such settings are quite common. For example, multiparameter lights are often operated in groups in, for example, churches, theatres and television studios, where the ambient temperature in the vicinity of a group of lights may rise to above about 50 degrees Celsius. When the ambient temperature is high, the variable speed fan of a multiparameter light operates near or at maximum speed and creates noise. Since several fans operating in close proximity at maximum speed create quite a lot of noise, forced air cooled multiparameter lights are not entirely suitable for use at locations where a high noise level is not acceptable. Convection cooled multiparameter lights may be used where the noise of a forced air cooled multiparameter light is unacceptable. However, convection cooled multiparameter lights typically utilize lamps that generate less heat and are constructed of expensive high temperature materials.

For either convection cooled or forced air cooled multiparameter lights, a thermal sensor or thermal cutoff switch may be employed to remove the supply voltage to the lamp if the temperature monitored by the sensor reaches a maximum allowable safe temperature. Unfortunately, this means that if the multiparameter light is operated in high enough ambient temperatures, the lamp may shut down. It is possible that during a performance event with high ambient temperatures, one or more of the multiparameter lights in the event may inadvertently shut down, causing great inconvenience and distraction.

Permitting a multiparameter light to run too hot is not a good option. As the temperature of the lamp housing increases, the temperature of all the components in the lamp housing also increases. Typically, lamp life is shortened. The motors used for the automation can easily reach critical operating temperatures and sustain damage. Electronic circuitry if contained within the lamp housing, may reach operating temperatures that greatly shorten the life of components therein such as semiconductors, capacitors and transformers. Additional components and materials used for the construction and proper operation of the instrument and lamp housing may also be affected, such as polymers, elastomers and lubricants.

SUMMARY OF THE INVENTION

The temperature of a multiparameter light and/or individual components thereof is advantageously controlled in accordance with the present invention, which in one embodiment is a multiparameter light comprising a housing, a variable power supply, a lamp, at least one light makeup parameter component, an orientation sensor, and a control system. The variable power supply has an output and a control input. The lamp is contained at least in part within the housing and coupled to the output of the variable power supply. The light makeup parameter component is contained at least in part within the housing. The orientation sensor has a determinable relationship with the multiparameter light. The control system has an input for receiving commands, an input coupled to the orientation sensor, an output coupled to the light makeup parameter component, and an output coupled to the input of the variable power supply.

Another embodiment of the present invention is a multiparameter light comprising a housing, a variable power supply, a lamp, at least one light makeup parameter component, and a control system. The variable power supply has an output and a control input. The lamp is contained at least in part within the housing and coupled to the output of the variable power supply. The light makeup parameter component is contained at least in part within the housing. The control system has an output coupled to the light makeup parameter component, an output coupled to the input of the variable power supply, and means for setting the variable power supply in accordance with a light makeup parameter to avoid excessive heating of the multiparameter light or at least one component thereof.

Another embodiment of the present invention is a multiparameter light comprising a housing, a variable power supply, a lamp, at least one orientation parameter component, and a control system. The variable power supply has an output and a control input. The lamp is contained at least in part within the housing and coupled to the output of the variable power supply. The orientation parameter component is coupled to the housing. The control system has an output coupled to the orientation parameter component, an output coupled to the input of the variable power supply, and means for setting the variable power supply in accordance with an orientation parameter to avoid excessive heating of the multiparameter light or at least one component thereof.

Another embodiment of the present invention is a multiparameter light comprising housing means, light source means contained at least in part within the housing means, means for applying power to the light source means, means responsive to a light makeup parameter command for activating a light makeup parameter of the multiparameter light, and means for adjusting power to the light source means in accordance with the light makeup parameter to avoid excessive heating of the multiparameter light or at least one component thereof.

Another embodiment of the present invention is a multiparameter light comprising housing means, light source means contained at least in part within the housing means, means for applying power to the light source means, means responsive to an orientation parameter command for activating an orientation parameter of the multiparameter light to place the multiparameter light in a new orientation, and means for adjusting power to the light source means in accordance with the orientation parameter to avoid excessive heating of the multiparameter light or at least one component thereof.

Another embodiment of the present invention is a method of operating a multiparameter light comprising a lamp, a housing for the lamp, and a light makeup parameter. The method comprises applying power to the lamp, activating the light makeup parameter in response to a light makeup parameter command, and adjusting the power to the lamp in accordance with the light makeup parameter to avoid excessive heating of the multiparameter light or at least one component thereof.

Another embodiment of the present invention is a method of operating a multiparameter light comprising a lamp, a housing for the lamp, and an orientation parameter. The method comprises applying power to the lamp, activating the orientation parameter in response to an orientation parameter command to place the multiparameter light in a new orientation, and adjusting the power to the lamp in accordance with the orientation parameter to avoid excessive heating of the multiparameter light or at least one component thereof.

Another embodiment of the present invention is a method of controlling operating temperature of a multiparameter light responsive to parameter commands, or a component thereof, and comprising a housing and a lamp contained at least in part within the housing.

The method comprises applying power to the lamp, establishing an orientation of the multiparameter light, wherein projected light from the multiparameter light is directed to a desired location external of the multiparameter light, and adjusting the power to the lamp in accordance with the orientation to avoid excessive heating of the multiparameter light or at least one component thereof.

Another embodiment of the present invention is a multiparameter light comprising a housing, a lamp, a shutter, an orientation sensor, and a control system. The lamp is contained at least in part within the housing. The shutter is contained at least in part within the housing and disposed in a light path, the shutter being capable of different amounts of A light transmission. The orientation sensor has a determinable relationship with the multiparameter light. The control system has an input for receiving commands, an input coupled to the orientation sensor, and an output coupled to the shutter.

Another embodiment of the present invention is a multiparameter light comprising a housing, a lamp, a shutter, light makeup parameter component, and a control system. The lamp is contained at least in part within the housing. The shutter is contained at least in part within the housing and disposed in a light path, the shutter being capable of different amounts of light transmission. The light makeup parameter component is contained at least in part within the housing. The control system has an output coupled to the light makeup parameter component, an output coupled to the shutter, and means for setting the shutter to an amount of light transmission in accordance with a light makeup parameter to avoid excessive heating of the multiparameter light or at least one component thereof.

Another embodiment of the present invention is a multiparameter light comprising a housing, a lamp, a shutter, an orientation parameter component, and a control system. The lamp is contained at least in part within the housing. The shutter is contained at least in part within the housing and disposed in a light path, the shutter being capable of different amounts of light transmission. The orientation parameter component is coupled to the housing. The control system has an output coupled to the orientation parameter component, an output coupled to the shutter, and means for setting the shutter to an amount of light transmission in accordance with an orientation parameter to avoid excessive heating of the multiparameter light or at least one component thereof.

Another embodiment of the present invention is method of operating a multiparameter light comprising a lamp, a housing for the lamp, a shutter in the light beam, and a light makeup parameter. The method comprises applying power to the lamp, activating the light makeup parameter in response to a light makeup parameter command, and setting the shutter to an amount of light transmission in accordance with the light makeup parameter to avoid excessive heating of the multiparameter light or at least one component thereof.

Another embodiment of the present invention is a method of operating a multiparameter light comprising a lamp, a housing for the lamp, a shutter in the light beam, and an orientation parameter. The method comprises applying power to the lamp, activating the orientation parameter in response to an orientation parameter command to place the multiparameter light in a new orientation, and setting the shutter to an amount of light transmission in accordance with the orientation parameter to avoid excessive heating of the multiparameter light or at least one component thereof.

Another embodiment of the present invention is a method of controlling operating temperature of a multiparameter light responsive to parameter commands, or a component thereof, and comprising a housing, a lamp contained at least in part within the housing, and a shutter in a light beam from the lamp. The method comprises applying power to the lamp, establishing an orientation of the multiparameter light, wherein projected light from the multiparameter light is directed to a desired location external of the multiparameter light, and setting the shutter to an amount of light transmission in accordance with the orientation to avoid excessive heating of the multiparameter light or at least one component thereof.

DETAILED DESCRIPTION OF THE PREFERRED EMBODIMENT

Figure 1:
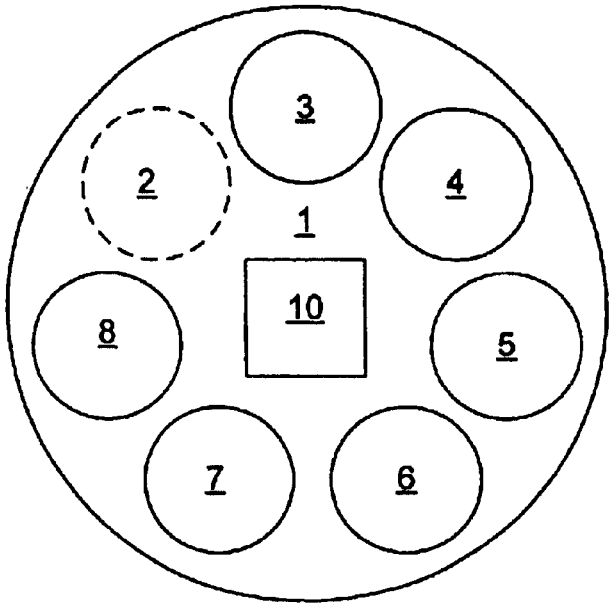
FIG 1 (PRIOR ART)
FIG. 1 is a schematic drawing of a frontal view of a filter wheel for a multiparameter light.
Figure 2:
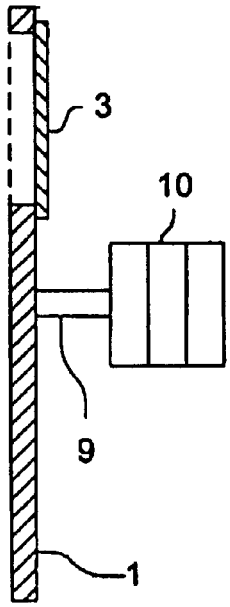
FIG 2 (PRIOR ART)
FIG. 2 is a schematic drawing of a side view of the filter wheel of FIG. 1.
Figure 3:
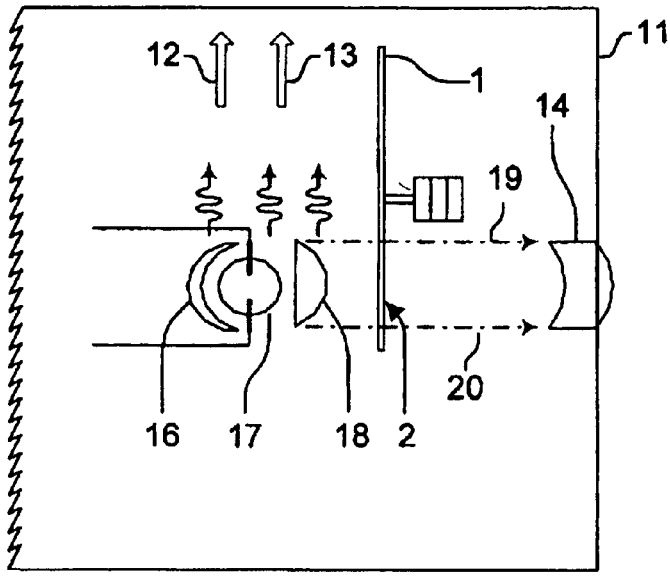
FIG 3 (PRIOR ART)
FIG. 3 is a schematic drawing of a section of a multiparameter light in a horizontal position that includes a lamp, reflector, condensing lens, and a filter wheel having an opening for the passage of a beam of light.

A multiparameter light is a type of theater light that includes a light source such as a lamp in combination with one or more optical components such as reflectors (the lamp and reflector may be integrated if desired), lenses, filters, iris diaphragms, shutters, and so forth for creating special lighting effects by affecting the makeup of the light exiting the multiparameter light lamp housing, various electrical and mechanical components such as motors and other types of actuators, wheels, gears, belts, lever arms, and so forth for operating the optical components, a suitable control system for controlling the parameters of the multiparameter light, and suitable power supplies for the lamp, motors, and electronics.

The lamp is contained at least in part within a lamp housing to suppress spurious light emissions. Typically, the lamp is completely enclosed by the lamp housing, which also contains the other optical components and many of the electrical and mechanical components which operate them. The power supplies and the electronics are also contained within the lamp housing in some types of multiparameter lights, but are contained within a separate housing apart from the lamp housing in other types of multiparameter lights.

As the lamp and the various components within the lamp housing generate a great deal of heat, the temperature within the lamp housing is managed by controlling the amount of power furnished to the lamp in accordance with the orientation of the lamp housing and/or the light makeup parameter being carried out by the multiparameter light. The orientation of the lamp housing is sensed or determined in any desired manner, such as, for example, by monitoring parameter commands involving orientation such as tilt, by monitoring control signals sent to stepper motors, and/or by monitoring one or more orientation sensor(s) that has a determinable and preferably fixed relationship to some part of the multiparameter light. The light makeup parameter being carried out by the multiparameter light is sensed or determined in any desired manner, such as, for example, by monitoring commands to the multiparameter light or by suitable sensors mounted on or near the components that implement the parameter.

Two examples of how temperature within the lamp housing is managed by monitoring parameter commands are as follows. As a first example, when a light makeup parameter command is given for a color wheel (see, e.g., FIG. 1) to move to, say, position five, the control system determines the number of steps required for the stepper motor to move the color wheel from its present position, which is known to the control system, to the new position. The control system then increments the stepper motor the required number of steps necessary to move the color wheel to position five. At any desired time during this process, the control system also determines if the lamp power should be changed, either increased or decreased, from its current level due to the light makeup parameter command, and implements any such change. As a second example, when the operator at the remote console desires that the lamp housing of a multiparameter light assume a new orientation, the control system determines the number of steps required for a stepper motor to move the lamp housing to the new orientation. The control system then increments the stepper motor the required number of steps necessary to implement the new orientation. At any desired time during this process, the control system also determines if the lamp power should be changed, either increased or decreased, from its current level due to the orientation parameter command, and implements any such change.

Orientation may also be determined from an orientation sensor, either directly or in conjunction with the monitoring of parameter commands or the monitoring of control signals within the multiparameter light. An orientation sensor is any type of sensor that senses relationships useful for determining a body's orientation over many points in space, including, for example, such relationships as angle of inclination relative to the earth, angle of rotation of a body relative to an axis, and acceleration of a body relative to a previous position. Many different types of orientation sensors are well known and are commercially available. A fixed relationship is established in any suitable way, including, for example, fastening the orientation sensor to any housing member, frame member, or mounting base or bracket member of the multiparameter light; or by integrating the orientation sensor into a printed circuit board or a card that is insertable into the multiparameter light.

While any control system of software/firmware controlled or "hardwired" (including application specific and programmable array) logic and memory may be used in the multiparameter light to receive and process sensor signals and process commands, including parameter change commands, from a remote console, preferably a microprocessor-based control system is used. The control system processes commands received from the remote console and signals received from the orientation sensor to obtain suitable control signals, which are applied to the control input of the lamp power supply to adjust the power to the lamp. In a microprocessor implementation, for example, the microprocessor preferably uses operational codes to generate control signals for setting the output power of the power supply in response to an orientation parameter or a light makeup parameter. The control system may also take other factors into consideration. Examples of such other factors include the rate of temperature change, the mean or average temperature over a period of time, the degree of similarity of the present temperature variations with stored profiles of commonly encountered temperature events, degree of control sensitivity, degree of control hysteresis, the type of lamp in use, the age of the lamp in use, and so forth.

Lamp power is reduced when certain parameters or lamp housing positions are selected, to allow safe operation of the multiparameter light. The lamp power is lowered enough to protect the components contained in the lamp housing, and particularly those components that would otherwise tend to overheat due to the new position or parameter change. Preferably, the speed with which and amount by which power is reduced is limited so that the audience generally does not notice the change. For example, the change in light intensity caused by lowering the lamp power by about 15% to 20% over at least several seconds gradually as to avoid a flicker, would not be visually observable to most people.

Figure 4:
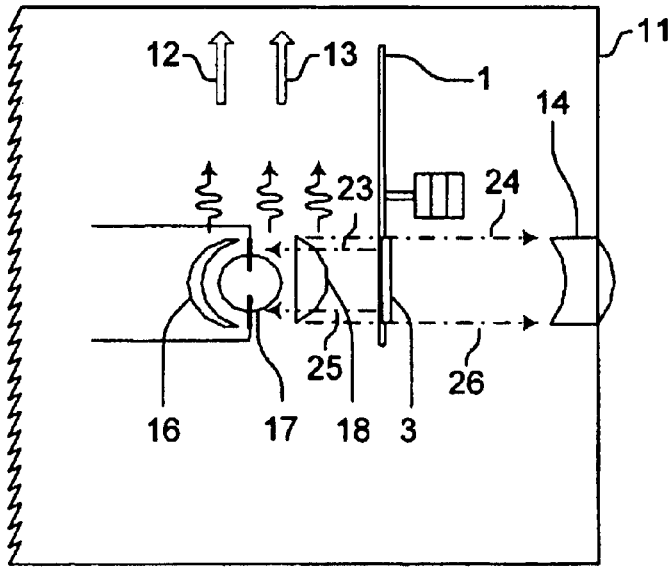
FIG 4 (PRIOR ART)
FIG. 4 is a schematic drawing of a section of a multiparameter light in a horizontal position that includes a lamp, reflector, condensing lens, and a filter wheel having a reflecting-type filter in the path of a beam of light.
Figure 5:
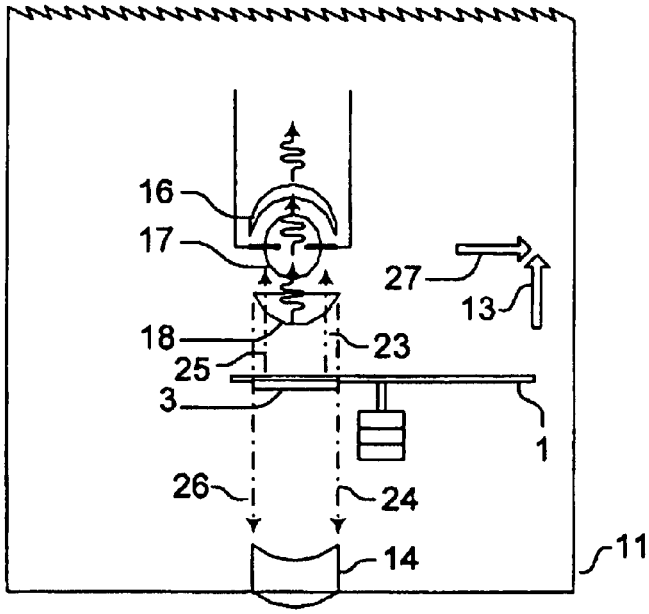
FIG 5 (PRIOR ART)
FIG. 5 is a schematic drawing of a section of a multiparameter light in a vertical position that includes a lamp, reflector, condensing lens, and a filter wheel having an opening for the passage of a beam of light.
Figure 6:
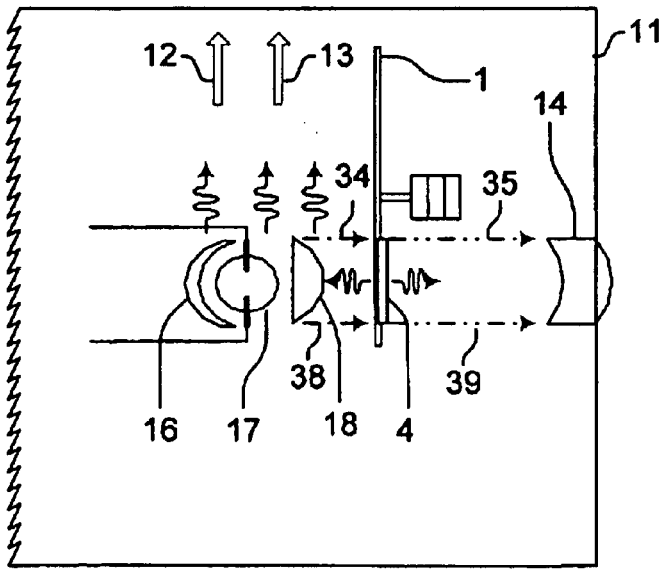
FIG 6 (PRIOR ART)
FIG. 6 is a schematic drawing of a section of a multiparameter light in a horizontal position that includes a lamp, reflector, condensing lens, and a filter wheel having an absorbing-type filter in the path of a beam of light.
Figure 7:
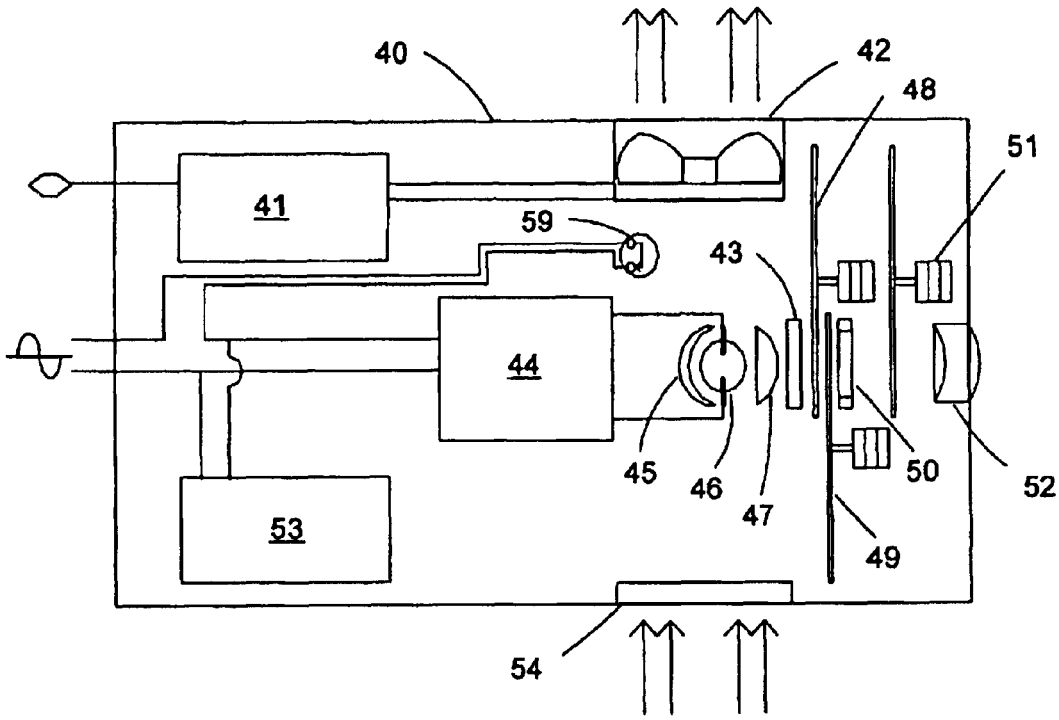
FIG 7 (PRIOR ART)
FIG. 7 is a block schematic diagram of a prior art force air cooled multiparameter light with a thermal power line switch.
Figure 8:
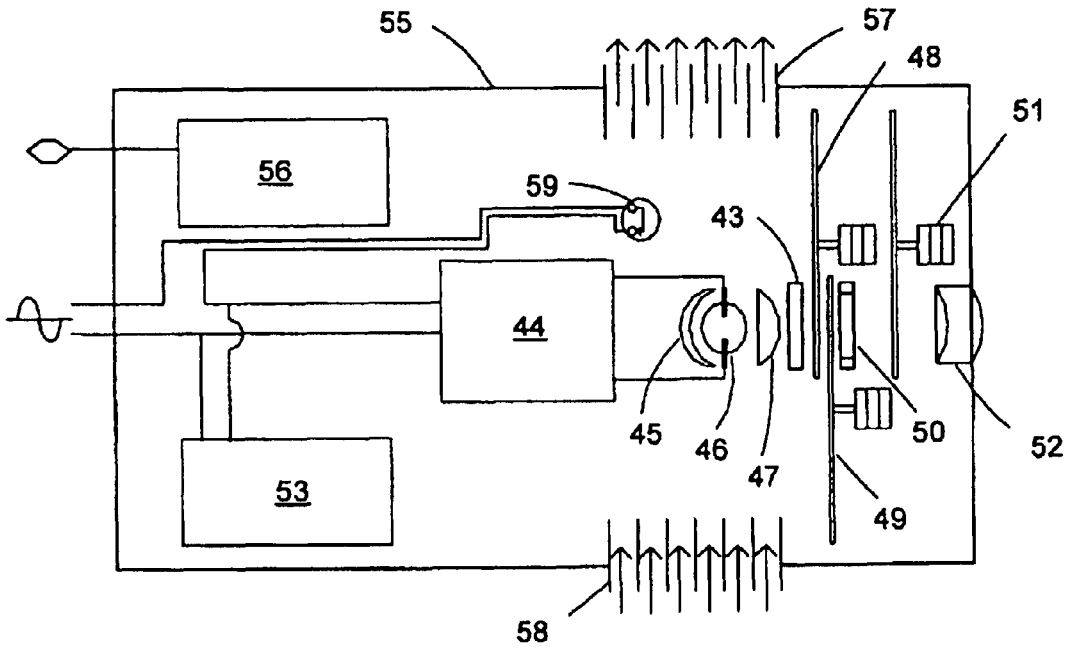
FIG 8 (PRIOR ART)
FIG. 8 is a block schematic diagram of a prior art convection cooled multiparameter light with a thermal power line switch.
Figure 9:
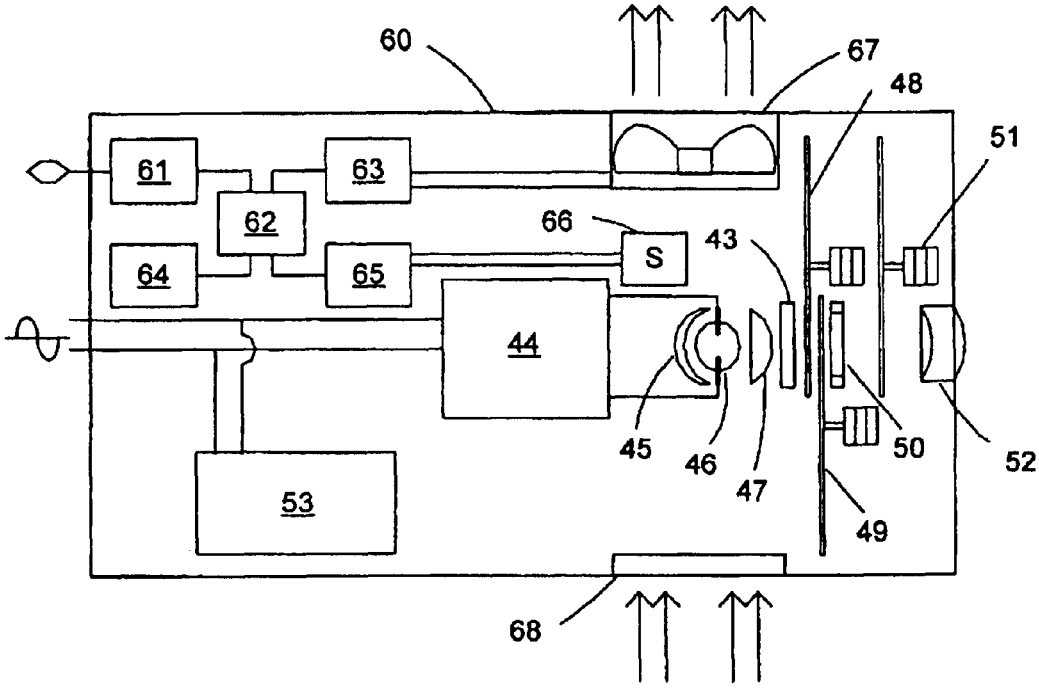
FIG 9 (PRIOR ART)
FIG. 9 is a block schematic diagram of a prior art force air cooled multiparameter light with a variable speed fan.
Figure 10:
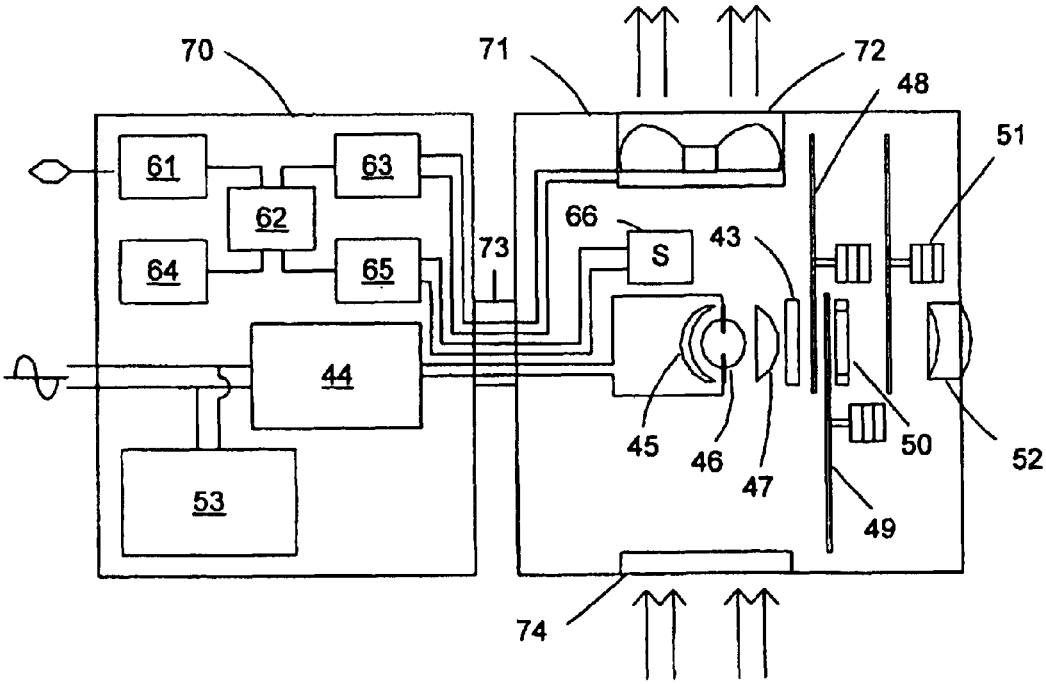
FIG 10 (PRIOR ART)
FIG. 10 is a block schematic diagram of a prior art force air cooled multiparameter light having a base section and a lamp housing section, the lamp housing section having a variable speed fan.

An additional advantage of operating at reduced power is to extend the life of many of the components in the multiparameter light. One component that generally benefits is the lamp itself because of the avoidance of high pinch temperatures that can otherwise arise under certain circumstances; see, e.g., FIGS. 4 and 5. The "pinch" is the area of many types of lamps where the bulb has been pinched to seal around the exiting electrode wires. The pinch of the bulb is sensitive to oxidization of the electrode wires at high temperatures. As the electrode wires oxidize, the pinch seal eventually fails and leaks the pressurized gases out of the bulb. Maintaining the pinch temperature below about 350 degrees Celsius typically allows the lamp to realize longer life. The majority of an audience would not notice any difference from a reduction in lamp operating temperature, provided that the reduction is not too severe. For example, a 50° C. drop in pinch temperature generally would not be noticeable. The pinch temperature of a lamp is directly related to the power of a lamp so it may only take a mere 15% reduction in power to compensate for this. For example, say the lamp is operating at 700 watts and the pinch temperature is 400° C. at an ambient temperature of 25° C. Reducing the power to the lamp to, illustratively, 595 watts, which is a 15% reduction in power, leads to a corresponding pinch temperature of 400° C. minus 25° C. ambient, or 375° C., minus 15% or approximately 319° C. Add back the ambient of 25° C. to 318° C. results in a much more desirable estimated pinch temperature of 344° C. Hence, 15% drop in lamp power results in an estimated lamp pinch temperature of 344° C. from 400° C. To avoid being noticeable to the audience, the lamp power may be reduced moderately slowly over a period of time, or may be done rapidly during some types of parameter changes.

Generally, lower operating power can benefit many of the components of a multiparameter light such as the motors, semiconductors, capacitors, transformers, polymers, elastomers, and lubricants.

Various techniques may be used to adjust power to the lamp in accordance with the orientation of the lamp housing and/or the light makeup parameter being carried out by the multiparameter light. A simple technique for adjusting power to the lamp is to set the power level directly, based solely on the orientation of the lamp housing and/or on the activation of a particular light makeup parameter. The appropriate settings may be determined empirically or by calculation. This technique is effective when the lamp is not normally operated other than at continuous full power. However, a lamp of a multiparameter light having a variable power supply may be operated using various power schemes at different times, including continuous full power, reduced power, and various power levels and cycles to create flash, strobe, and lightning special effects. Under these circumstances, one may wish to adjust the power to the lamp by modifying the power scheme rather than by setting the power level directly. An illustrative way of doing this is to determine a lamp power adjustment factor which embodies how the power scheme should be changed to avoid overheating any one or combination of components in the multiparameter light due to a change in orientation of the lamp housing or the activation of a new light makeup parameter. The formulation of a lamp power adjustment factor may be determined empirically or by calculation. The two techniques described herein are exemplary, and other techniques may be used if desired.

An example of how power to the lamp may be adjusted in accordance with the light makeup parameter being carried out by the multiparameter light is the following. If a particular filter material were inserted into a specific color wheel aperture but were to have a lower operating temperature than the other materials on the color wheel, a reduction in lamp power should be made to occur when that specific aperture of the color wheel is brought into the light beam. If the lamp of the multiparameter light in this example operates normally at 700 watts for other filter material in the apertures of the color wheel, the lamp power should be reduced when the aperture containing the particular filter material with the lower operating temperature is brought into the light beam. If the particular filter material has an upper continuous operating temperature of, say, 200° C. but is measured at 300° C. when brought into the light beam produced by the 700 watt lamp, a reduction in the temperature of the filter material from 300° C. to 200° C. would require a corresponding reduction of lamp power, taking appropriate consideration of the ambient temperature and other heat sources corresponding to the parameter such as, in this example, the filter wheel motor.

The technique of varying the power to the lamp of a multiparameter light to furnish an appropriate amount of power to the lamp in accordance with the orientation of the lamp housing and/or the light makeup parameter being carried out by the multiparameter light is of great advantage in both convection cooled systems and forced air cooled systems. The lamp housing and the components contained therein do not operate at excessive temperatures even though conditions exist that would otherwise create unacceptably high internal temperatures, or in the case of forced air cooled multiparameter lights, unacceptably high fan noise levels. In other words, the fan of a multiparameter light need not be operated faster to deal with high temperatures in the lamp housing. Advantageously, reducing power to the lamp when a parameter or orientation exists that would otherwise cause an excessive temperature increase avoids having to shut down the lamp.

Figure 11:
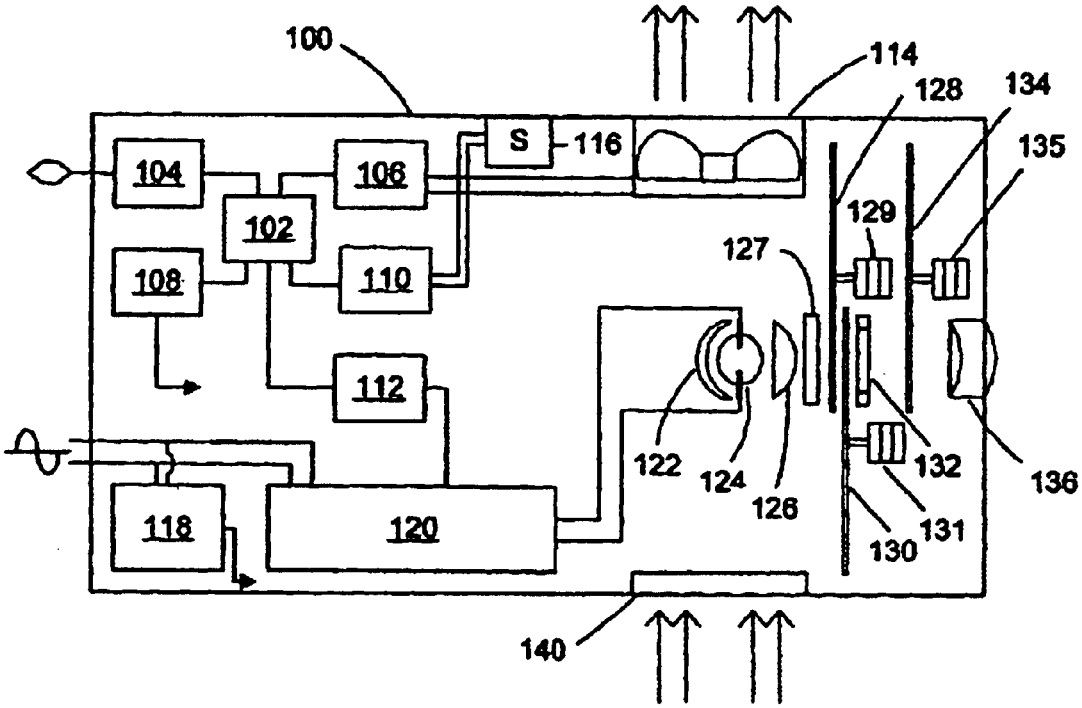
FIG. 11 is a block schematic diagram of a force air cooled multiparameter light which is contained in a lamp housing and includes a variable lamp power supply for heat management.

FIG. 11 is a block diagram of a forced air cooled multiparameter light which varies lamp power in accordance with the orientation of the lamp housing as detected by an angle of inclination sensor, and/or the light makeup parameter being carried out by the multiparameter light. A lamp housing 100 illustratively contains a number of conventional optical components well known in the art, such as, for example, a reflector 122, a lamp 124, a condensing lens 126, a filter wheel 128, a stepper motor 129 for the filter wheel 128, another filter wheel 130, a stepper motor 131 for the filter wheel 130, an iris diaphragm 132, another filter wheel 134, a stepper motor 135 for the filter wheel 134, and a focusing lens 136. The lamp housing 100 also contains control system circuitry which illustratively includes a microprocessor 102 (memory not shown), a communications interface 104, a fan interface 106 (which may be an interface for a variable speed fan or an on/off fan, as desired), a motor control interface 108 (control connections to motors not shown), an orientation sensor interface 110, and a variable power supply interface 112. The control system circuitry may be contained on a single logic card or on several logic cards, as desired. The lamp housing 100 has a forced air cooling system which includes an air intake vent 140 and a combination fan and exhaust vent 114. The fan 114 may be a one speed fan, a variable speed fan, or an on/off type fan. If desired, other fans and other vents may be used in the forced air cooling system, as is well known in the art; for example, a fan may be positioned at the intake vent 140 to push air into the lamp housing 100. An orientation sensor 116 illustratively is contained within the lamp housing 100. The orientation sensor 116 preferably is an angle of inclination sensor such as, for example, the model 3DM solid state 3-axis (pitch, roll & yaw) sensor, which is available from MicroStrain, Inc. of Burlington, Vt. The lamp housing 100 also contains various power supplies such as a motor and electronics power supply 118 (power connections to motors and electronics not shown), and a variable lamp power supply 120. The orientation sensor 116 provides angle of inclination data to the microprocessor 102.

A convection cooled version of the forced air cooled mutliparameter light of FIG. 11 lacks the fan 114 but has additional vents for the convection flow of air.

Figure 12:
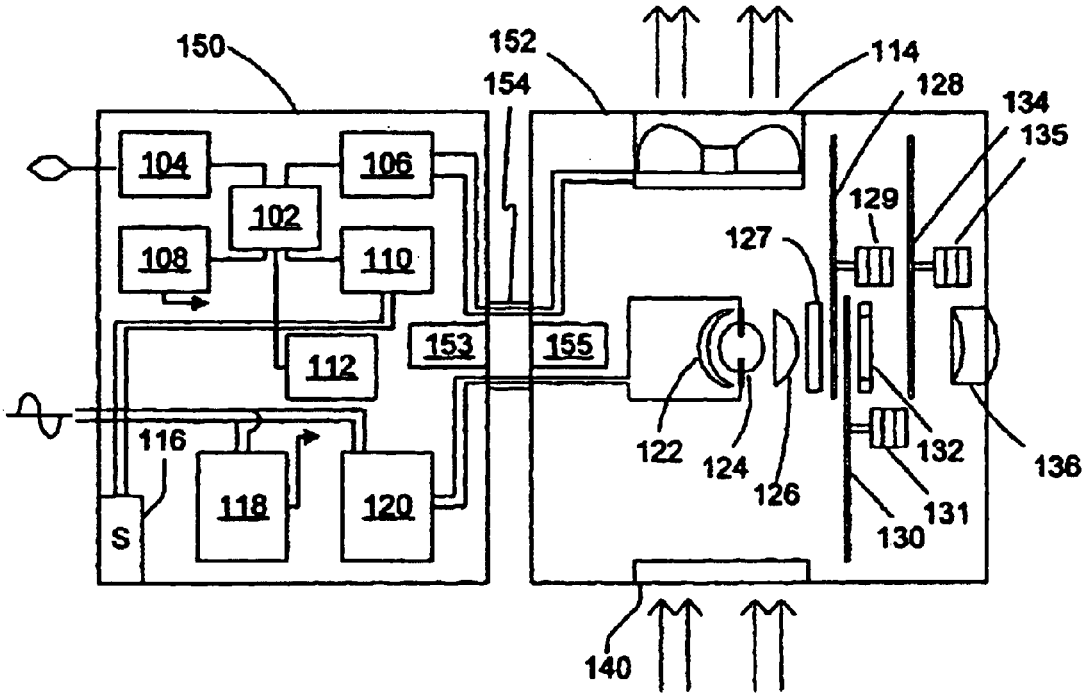
FIG. 12 is a block schematic diagram of a force air cooled multiparameter light which has a base housing and a lamp housing and includes a variable lamp power supply for heat management.

FIG. 12 is a block diagram of a forced air cooled multiparameter light which varies lamp power in accordance with the orientation of the lamp housing as calculated from an angle of rotation sensor, and/or the light makeup parameter being carried out by the multiparameter light. The forced air cooled multiparameter light shown in FIG. 12 has the same type of components as the multiparameter light of FIG. 11, but has separate base and lamp housing sections with respective housings 150 and 152. The base housing 150 contains the communications interface 104, the microprocessor 102, the fan interface 106, the motor control interface 108, the orientation sensor interface 110, the variable power supply interface 112, the orientation sensor 116, the motor and electronics power supply 118, and the variable lamp power supply 120. The lamp housing 152 contains the reflector 122, the lamp 124, the condensing lens 126, the filter wheels 128, 130 and 134, the stepper motors 129, 131 and 135, the iris diaphragm 132, and the focusing lens 136. Various wires are run between the base housing 150 and the lamp housing 152 (some wires are omitted for clarity) through a wireway 154, which typically is a flexible conduit or a pathway between the bearings used to attach the lamp housing 152 to the base housing 150 on pan and tilt lights. As is well known in the art, pan and tilt lights typically incorporate stepper motors such as stepper motor 153 for pan and stepper motor 155 for tilt. Air enters the interior of the lamp housing 152 through an intake vent 140, and is drawn through the lamp housing 152 by the variable speed fan 114 and exits the lamp housing 152 through the variable speed fan 114.

The orientation of the lamp housing 152 is determined from the orientation of the base housing 150 as sensed by the orientation sensor 116, and the orientation of the lamp housing 152 relative to the base housing 150. The orientation of the lamp housing 152 relative to the base housing 150 is determined in any suitable manner, such as, for example, by monitoring orientation parameter commands, by monitoring control signals that are sent to stepper motors 153 and 155 and involve movement, and/or by monitoring one or more angle of rotation sensors (not shown) mounted near the rotation sites of the yoke. Alternatively, the orientation sensor 116 may be installed (not shown) so that it senses the orientation of the lamp housing 152 directly, although such an installation would expose the orientation sensor 116 to higher ambient temperatures and require additional wiring through the wireway 154.

A convection cooled version of the forced air cooled mutliparameter light of FIG. 12 lacks the fan 114 but has additional vents for the convection flow of air.

Orientation sensors may be placed in any suitable location depending on the type of sensor and the type of multiparameter light. For example, a type of sensor that directly senses angle of inclination in three axes relative to earth, such as the model 3DM sensor available from MicroStrain Inc. of Burlington, Vt, is the most flexible type and can be mounted on the interior or exterior surface of a housing or on any component contained within the housing or protruding from the housing, provided that the sensor is mounted so as to respond to orientation of the housing. If the multiparameter light is of the type that uses a mounting bracket, which does not allow the lamp housing to rotate relative to its base, and the bracket is constrained to a horizontal planar mount, only a single axis angle of inclination sensor in the lamp housing is required. The type of sensor that measures acceleration is mounted like an angle of inclination sensor. The type of sensor that measures angle of rotation may be mounted, for example, in the vicinity of the bearings used to attach the lamp housing to the base housing on pan and tilt lights, or on the motor used for the tilt parameter.

Figure 13:
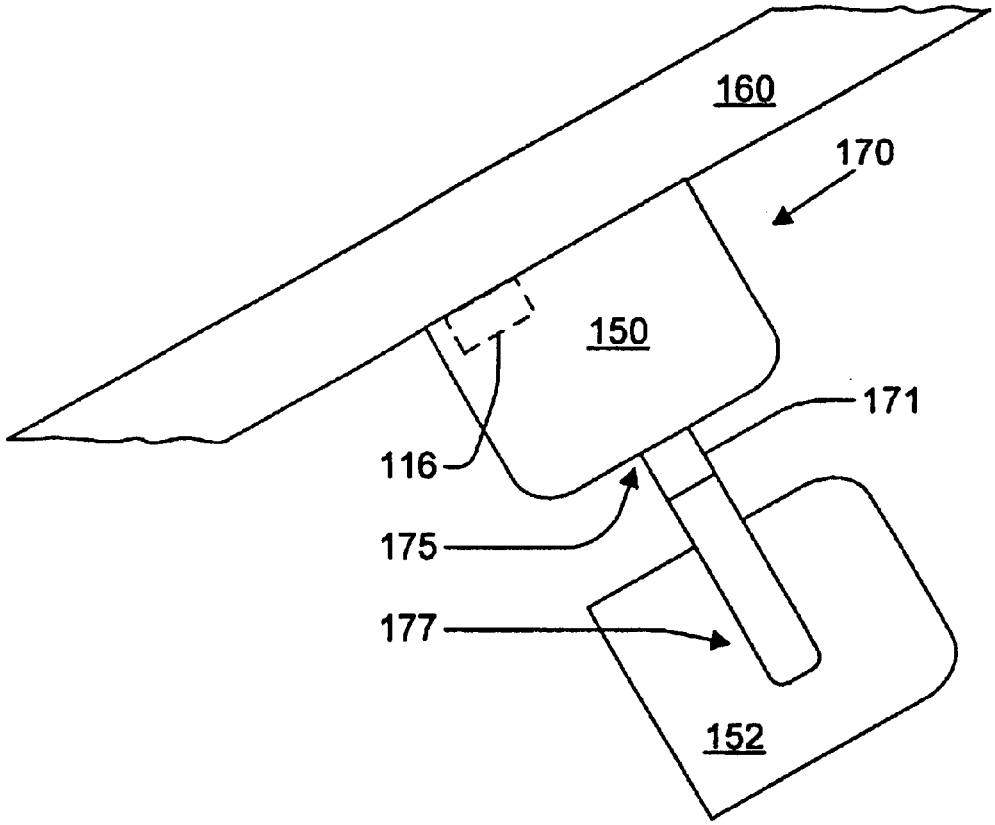
FIG. 13 is a schematic drawing showing the external aspect of the base housing and lamp housing of the multiparameter light of FIG. 12.

FIG. 13 is a side schematic drawing of an illustrative embodiment of the multiparameter light of FIG. 12 based on, for example, the model Studio Color® 575 wash fixture. FIG. 13 shows a multiparameter light 120 having the base housing 150, the lamp housing 152, and a connecting yoke 171. The light 170 is mounted on a slanting beam 160. The orientation sensor 116 (shown hidden) is mounted to the base housing 150. The yoke 171 rotates around axes shown at 175 and 177. The orientation of the lamp housing 152 relative to earth is calculated using the orientation of the base housing 150 as measured by the orientation sensor 116, and the orientation of the lamp housing 152 relative to the base housing 150, which is determined by monitoring of orientation parameter commands or control signals for the stepper motors that effect movement of the lamp housing 152.

Multiple sensors of similar or different types may be used to provide respective parts of the total orientation information, or may be used if desired to provide redundant information to ensure accuracy and backup protection in the event of failure of any of the sensors.

The process of varying lamp power in accordance with the light makeup parameter being carried out by a multiparameter light is useful with a variety of different parameters. The filter wheel shown in FIG. 1 is an example of one such parameter. The filter wheel parameter is varied by placing different filters having respective reflective or absorbing properties in the light beam, but other parameters may be varied by having their position varied over the length of the light path. Other examples of parameters are an iris, a frost filter, a diffusion filter, a prism, a graduated color wheel, a neutral density filter, a color correcting filter, a lens system, an electronically variable aperture such as an LCD or DMD as known in the art, a gobo wheel, a variable shutter, and a projection slide. The projection slide is particularly sensitive to overheating. The amount of heat resulting from the light beam in most multiparameter lights would overheat and destroy most types of projection film. However, damage to projection slides is avoided by reducing lamp power by an appropriate amount when the multiparameter light receives a command to place a projection slide parameter into the light beam. Actuators that move projection slides into the light path of a multiparameter light are well known in the art. When the microprocessor in a multiparameter light detects the command to place a projection slide into the light beam, it essentially simultaneously issues control signals to reduce lamp power. Preferably, the power reduction is gradual over several seconds, to avoid being noticed by the audience.

Figure 14:
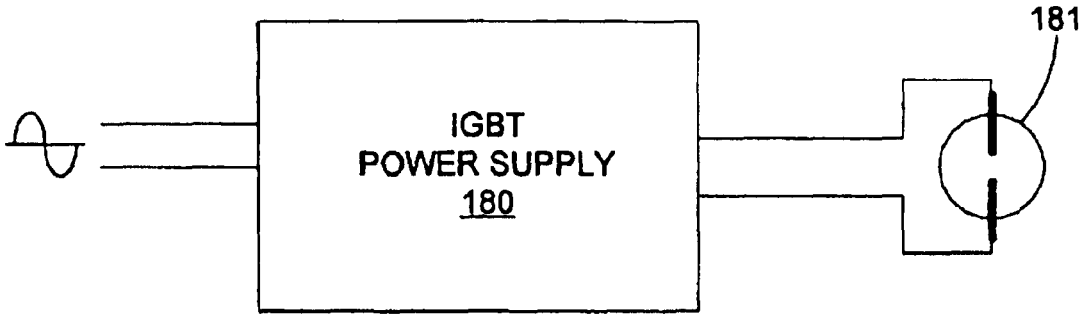
FIG. 14 is a block schematic diagram of a particular type of lamp and a suitable variable power supply.

The lamp 124 may be any suitable type, including arc lamps of the metal halide or xenon type, incandescent lamps, and solid state devices. The variable lamp power supply 120 may be implemented in various ways, depending on the type of lamp. For example, multiparameter lights are typically designed with metal halide or xenon arc lamps. These lamps may be operated from a transformer or a solid state power supply. Some solid state power supplies utilize a type of semiconductor output device known as an Insulated Gate Bipolar Transistor, or IGBT, which can be used to provide an adjustable current to the lamp as is well known in the art. FIG. 14 is a block diagram showing an IGBT lamp power supply 180 and a metal halide or xenon arc lamp 181.

Figure 15:
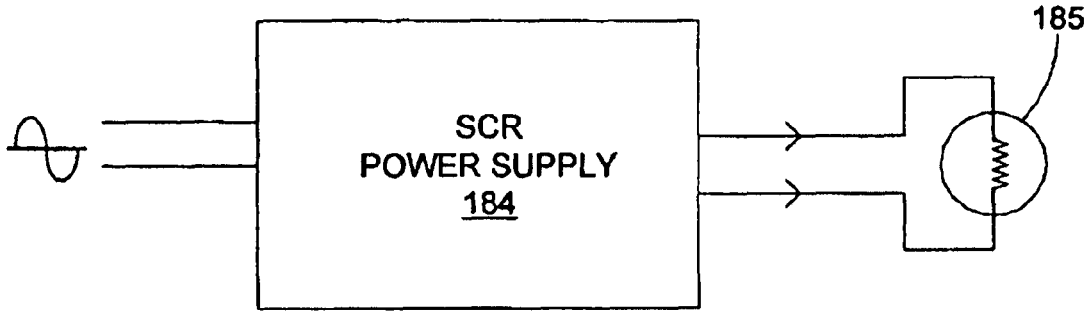
FIG. 15 is a block schematic diagram of another particular type of lamp and a suitable variable power supply.

Incandescent lamps may also be used as the light source for a multiparameter light. These filament type lamps may be operated from a variety of variable power supply types. One type of suitable power supply uses silicon controlled rectifiers, or SCRs, to vary the power to the incandescent lamp in a manner well known in the art. FIG. 15 is a block diagram showing an SCR lamp power supply 184 and a filament lamp 185.

Figure 16:
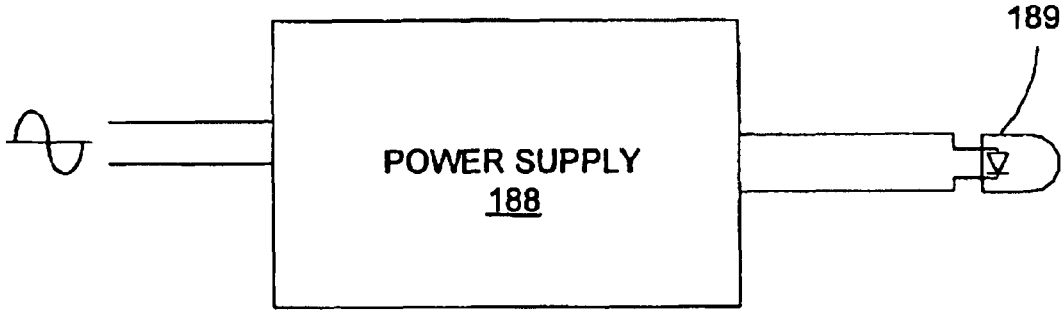
FIG. 16 is a block schematic diagram of yet another particular type of lamp and a suitable variable power supply.

Solid state lamps such as light emitting diodes, or LEDs, may also have power supplies constructed as to vary the power furnished to the lamp. One or more solid state light source(s) are used inside the lamp housing to achieve the desired specified maximum light output level. Various current and voltage control circuits may be used to adjust the power to the LEDs and hence the amount of heat generated by the LEDs in a manner well known in the art. FIG. 16 is a block diagram showing a suitable power supply 188 and an LED type lamp 189.

A variable power supply may also be obtained by passing the output of a fixed power supply through a variable inductance, through a voltage converter, or any other type of circuit capable of controllably varying a voltage, current or power to a lamp.

Figure 17:
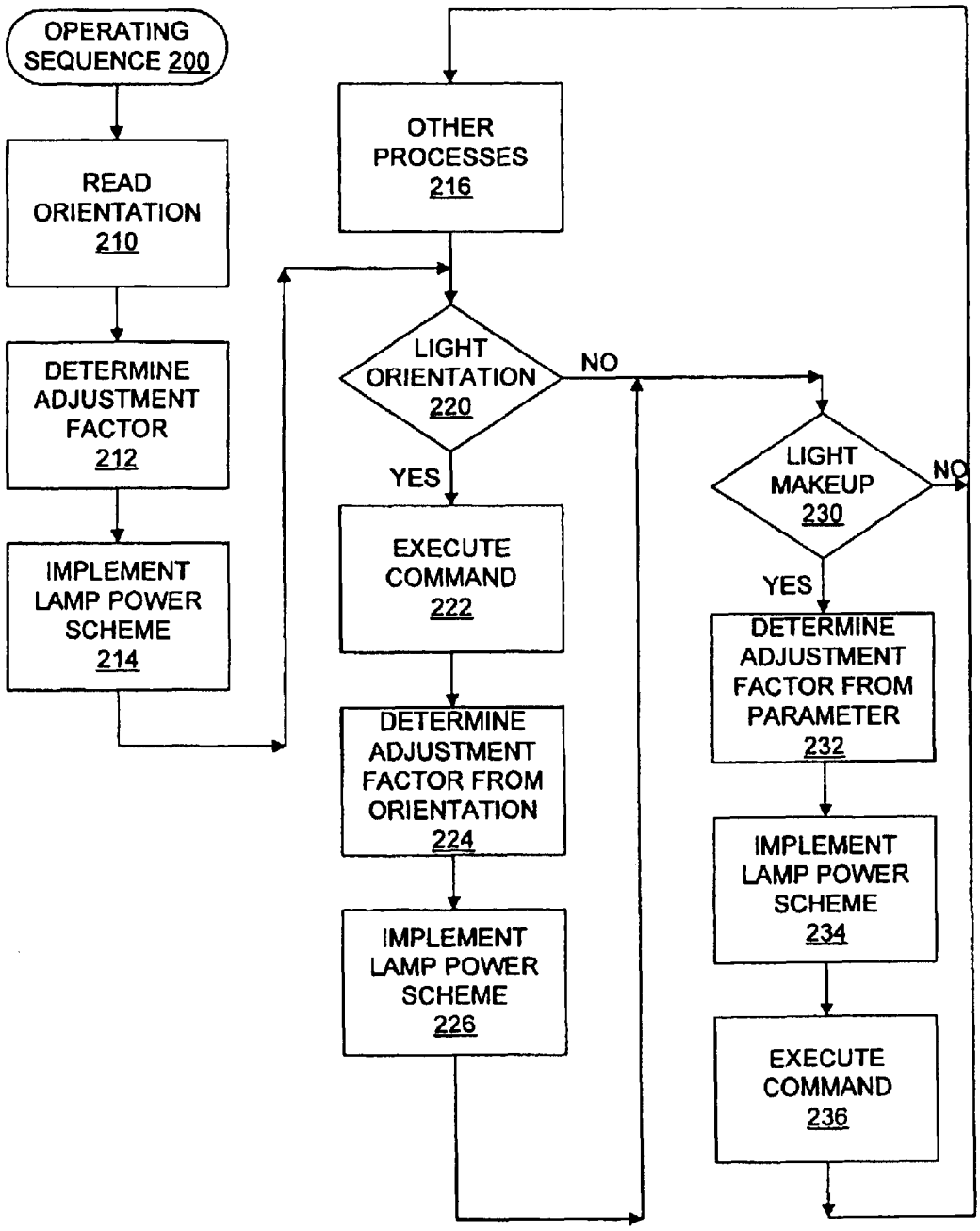
FIG. 17 is a flowchart of a method of operating the multiparameter light of FIG. 11 and FIG. 12.

An illustrative simple operating sequence 200 for, illustratively, the multiparameter light of FIGS. 11 and 12 is shown in FIG. 17. The operating sequence 200 controls the temperature of the multiparameter light by varying lamp power in accordance with the orientation of the lamp housing as determined from an orientation sensor, and/or the light makeup parameter being carried out by the multiparameter light. At some point in the standard initialization or calibration sequence, the variable power supply 120 for the lamp is set to an appropriate level as follows. The microprocessor 102 reads orientation data from the orientation sensor (block 210), determines an adjustment factor from the orientation data (block 212), and implements an initial lamp power scheme based on the adjustment factor (block 214). The determination of the adjustment factor depends on the type of orientation sensor and may be obtained from a look up table, from algorithmic calculation, or in any other suitable manner. Implementation of a lamp power scheme is described elsewhere in this document, with reference to the flowchart of FIG. 18.

In normal operation, the microprocessor 102 executes commands received from the remote console, including commands relating to such orientation parameters as pan and tilt, and to a variety of parameters involving light makeup. If the command involves an orientation parameter (block 220 YES), the command is executed (block 222), the adjustment factor is determined from the new orientation data (block 224), and a new lamp power scheme based on the adjustment factor is implemented (block 226). It will be appreciated that block 222 may occur in any order relative to blocks 224 and 226. If the command involves a light makeup parameter (block 230 YES), the adjustment factor is determined from the parameter (block 232), a new lamp power scheme based on the adjustment factor is implemented (block 234), and the command is executed (block 236). It will be appreciated that block 236 may occur in any order relative to blocks 232 and 234. It will also be appreciated that a single command may involve both an orientation parameter and a light makeup parameter (block 220 YES and block 230 YES) or neither an orientation parameter nor a light makeup parameter (block 220 NO and block 230 NO). The process flow continues with other processes that are part of normal operation (block 216).

Figure 18:
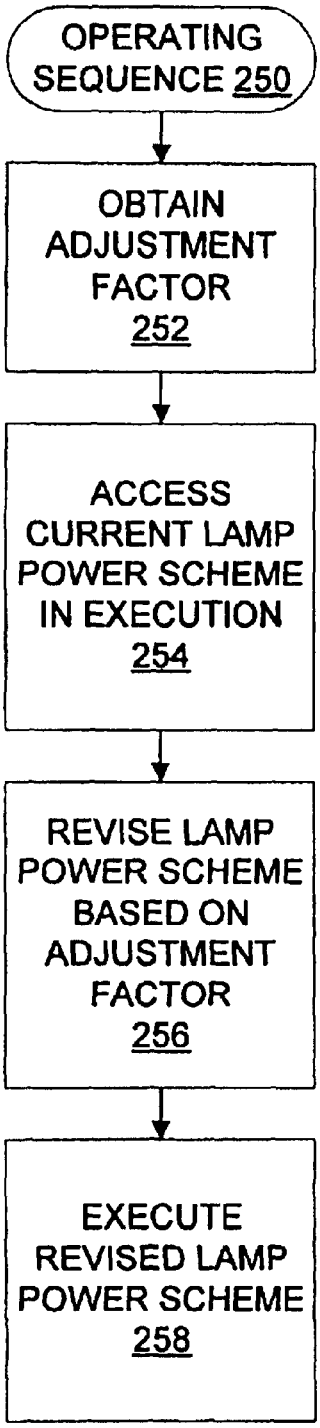
FIG. 18 is a flowchart of a method of implementing a lamp power scheme, which is useful in the method of FIG. 17.

FIG. 18 shows an illustrative process 250 for implementing a lamp power scheme, which illustratively is carried out in the microprocessor 102. An adjustment factor is first obtained (block 252), the adjustment factor having been determined from an orientation sensor or from a light makeup parameter. The current lamp power scheme in execution is accessed (block 254). In normal circumstances the current lamp power scheme typically is full power continuous operation, although lamp schemes vary from complex as involved in many effects such as electronic strobe and flash, to simple as involve in a slow linear ramp-like decrease of lamp power in response to, say, a new lamp orientation. Examples of complex lamp schemes as involved in electronic strobe and flash are described in U.S. patent application Ser. No. 60/280,613, filed Mar. 29, 2001 (Belliveau, Method and Apparatus for Generating a Flash or Series of Flashes from a Multiparameter Light), which hereby is incorporated herein in its entirety by reference thereto. The current lamp power scheme is revised based on the adjustment factor. If an orientation or parameter change would normally increase the temperature of the multiparameter light and the current lamp power scheme is full power operation, the current lamp power scheme is revised to decrease lamp power over a period of time to prevent overheating. On the other hand, if the current lamp power scheme is a decrease in lamp power and the new orientation or parameter permits full power operation without overheating, the decrease is replaced by an increase in lamp power over a period of time until normal full power operation is reached. Alternatively, if the current power scheme is a sequence of pulses subject to duty cycle control and a new orientation or parameter change would normally increase the temperature of the multiparameter light, the duty cycle is modified to avoid overheating. Once the current lamp power scheme is revised, the lamp is then operated in accordance with the new lamp power scheme.

Preferably, the operational code and any tables required for determination of the adjustment factor and for implementing the lamp power scheme is prepared by the vendor of the multiparameter light and either installed at the factory or installed by the operator during a setup or maintenance procedure. Modifications and updates may be installed by the operator during a setup or maintenance procedure. Setup and maintenance may be performed from either the remote console or from a maintenance control panel on the multiparameter light itself.

The multiparameter lights of FIGS. 11 and 12 may, if desired, include a thermal cutoff switch or sensor in the power line for safety and redundancy. The technique of varying lamp power is of great advantage for in allowing both convection cooled and forced air cooled multiparameter lights to continue to operate under conditions that may otherwise result in a disconnection of the lamp supply voltage by the thermal cutoff switch during a performance. Advantageously, as the orientation or parameter that would otherwise cause the temperature of one or more particular components or the internal temperature of the multiparameter light to rise is carried out, the lamp power is reduced before reaching the trigger level of the thermal switch. This allows the multiparameter light to continue to operate, while still providing for cutting off power to the lamp under extreme conditions or in an emergency.

While controlling the amount of power furnished to the lamp of a multiparameter light in accordance with orientation and parameter information is particularly effective for controlling the energy in the light beam, techniques other than control of lamp power may be used to control the energy in the light beam. For example, a shutter 127 (FIGS. 11 and 12) permits a light beam from the lamp to pass when open to any degree, whether fully or partially opened, but reduces the energy in the light beam when only partially opened. A partially opened shutter is useful when positioned in path of the light beam ahead of heat sensitive parameters, and particularly parameters such as projection slides which are especially sensitive to overheating.

Suitable shutters include mechanical shutters such as the shutter 43 (FIGS. 7–10), which function by physically blocking the light beam entirely or partially as is well known in the art. The mechanical shutter can be constructed of metal or ceramics, as is well known in the art. The materials of the mechanical shutter may be graduated to aid in the gradual attenuation of the light beam as the materials are placed into the light path by an actuator. Suitable shutters also include electronic light valves or electronically variable apertures of various types, including the well known liquid crystal ("LCD") type and the digital micromirror ("DMD") type. Generally speaking, shutters can be controlled so as to transmit specific amounts of light. For a mechanical shutter, the shutter material is gradually positioned in the light beam. For an electronic shutter, the light transmission characteristics of the device are varied electronically to control the amount of light transmitted.

The use of a shutter in the path of the light beam to control the amount of energy in the light beam has some drawbacks relative to varying power to the lamp, such as, for example, distortion of the light beam (unevenness at the cross-section of the beam) and some additional heating of the lamp housing of the multiparameter light. Nonetheless, the shutter is a common parameter in multiparameter lights, and the programming of a multiparameter light that does not have a variable power supply but that does have a shutter can be updated to carry out some of the techniques described herein at relatively little cost. Moreover, an orientation sensor can be retrofitted to a multiparameter light that does not have a variable power supply but that does have a shutter, and the programming thereof can be updated to carry out any of the techniques described herein.

Figure 19:
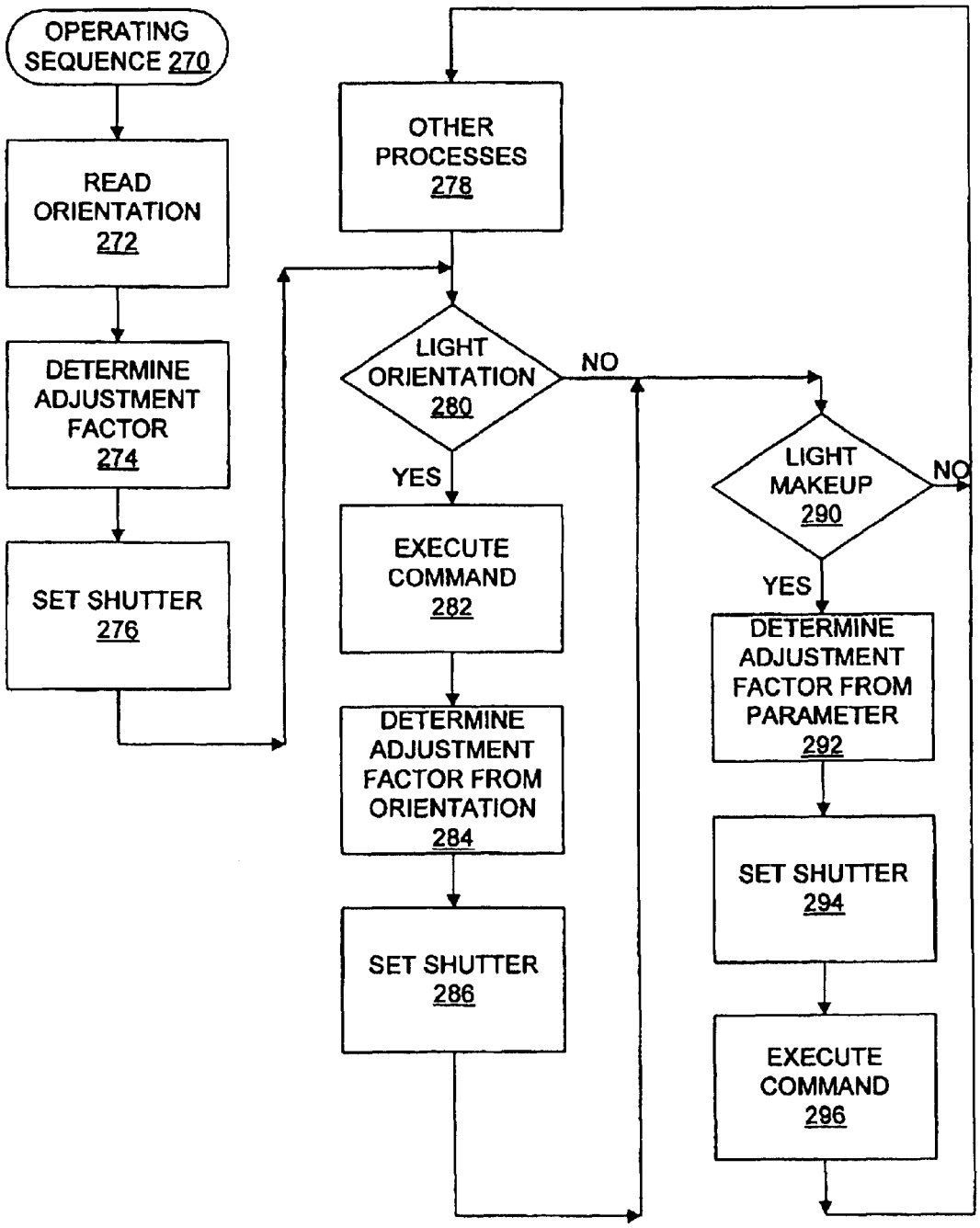
FIG. 19 is a flowchart of a method of operating a shutter in a multiparameter light.

FIG. 19 shows an illustrative simple operating sequence 270 for using a shutter of a multiparameter light to control the amount of energy in the light beam in accordance with the orientation of the lamp housing as determined from an orientation sensor, and/or the light makeup parameter being carried out by the multiparameter light. At some point in the standard initialization or calibration sequence, the shutter is set to an appropriate level as follows. The microprocessor 102 reads orientation data from the orientation sensor (block 272), determines a shutter adjustment factor from the orientation data (block 274), and sets the shutter based on the shutter adjustment factor (block 276). The determination of the shutter adjustment factor depends on the type of orientation sensor and may be obtained from a look up table, from algorithmic calculation, or in any other suitable manner.

In normal operation, the microprocessor 102 executes commands received from the remote console, including commands relating to such orientation parameters as pan and tilt, and to a variety of parameters involving light makeup. If the command involves an orientation parameter (block 280 YES), the command is executed (block 282), the shutter adjustment factor is determined from the new orientation data (block 284), and the shutter is set based on the adjustment factor is implemented (block 286). It will be appreciated that block 282 may occur in any order relative to blocks 284 and 286. If the command involves a light makeup parameter (block 290 YES), the shutter adjustment factor is determined from the parameter (block 292), the shutter is set based on the adjustment factor (block 294), and the command is executed (block 296). It will be appreciated that block 296 may occur in any order relative to blocks 292 and 294. It will also be appreciated that a single command may involve both an orientation parameter and a light makeup parameter (block 280 YES and block 290 YES) or neither an orientation parameter nor a light makeup parameter (block 280 NO and block 290 NO). The process flow continues with other processes that are part of normal operation (block 278).

Generally, the techniques described herein may be combined with other temperature control techniques to achieve a dynamic compromise that maximizes performance of the multiparameter light without experiencing overheating. It will be appreciated that the techniques described herein may be used individually in whole or in part, in combination with one another, or in combination with other temperature control techniques such as, for example, those described in co pending U.S. patent application Ser. No. 09/524,290, Filed Mar. 14, 2000 (Belliveau, Method and Apparatus for Controlling the Temperature of a Multi-Parameter Light), which hereby is incorporated herein in its entirety by reference thereto.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. For example, the thermal sensor may be placed in many different locations, multiple thermal sensors may be used, and various different types of control system circuitry, interfaces, variable voltage/current/power power supplies, and lamps may be used. Where a fan is used for forced air cooling, the fan may be located at the intake vent or the exhaust vent or other location as desired, and multiple fans may be used if desired. While the various parameter actuators may be motors, other types of actuators such as solenoid, rotary solenoid, and pneumatic may be used if desired. These and other variations and modifications of the embodiments disclosed herein may be made without departing from the scope and spirit of the invention as set forth in the following claims.

What is claimed is:

1. A multiparameter light comprising:

a housing;

a variable power supply having an output and a control input;

a lamp contained at least in part within the housing and coupled to the output of the variable power supply;

at least one *component for a* light makeup parameter*, the* component *being* contained at least in part within the housing;

an orientation sensor having a determinable relationship with the [multiparameter light] *component*; and a control system having an input for receiving commands, an input coupled to the orientation sensor, an output coupled to the light makeup parameter component, and an output coupled to the input of the variable power supply.

2. The multiparameter light of claim 1 wherein the orientation sensor comprises an angle of inclination sensor.

3. The multiparameter light of claim 1 wherein the orientation sensor comprises an angle of rotation sensor.

4. The multiparameter light of claim 1 wherein the orientation sensor comprises an accelerometer.

5. The multiparameter light of claim 1 wherein the variable power supply is an IGBT power supply and the lamp is an arc lamp.

6. The multiparameter light of claim 1 wherein the variable power supply is an SCR power supply and the lamp is an incandescent lamp.

7. The multiparameter light of claim 1 wherein the lamp is an LED array.

8. The multiparameter light of claim 1 wherein the control system comprises:

a microprocessor coupled to the control input of the variable power supply; and a sensor interface having an input coupled to the orientation sensor and an output coupled to the microprocessor.

9. The multiparameter light of claim 8 wherein the control system further comprises:

first operational codes for setting the variable power supply under microprocessor control in response to the light makeup parameter to avoid excessive heating in the multiparameter light; and second operational codes for setting the variable power supply under microprocessor control in response to the orientation sensor to avoid excessive heating [of] *in* the multiparameter light.

10. The multiparameter light of claim 1 wherein the control system further comprises:

means responsive to the light makeup parameter for generating a lamp power adjustment factor; and means responsive to the lamp power adjustment factor for setting the variable power supply to avoid excessive heating [of] in the multiparameter light.

11. The multiparameter light of claim 10 wherein the component is a *variable intensity light source comprising the variable power supply and the* lamp *coupled to the output thereof, the determinable relationship being between the orientation sensor and the lamp.*

12. The multiparameter light of claim 10 wherein the component is a projection pattern.

13. The multiparameter light of claim 10 wherein the component is an electronically variable aperture.

14. The multiparameter light of claim 10 wherein the component is a color filter.

15. The multiparameter light of claim 1 wherein the control system further comprises:

means responsive to the orientation sensor for generating a lamp power adjustment factor; and means responsive to the lamp power adjustment factor for setting the variable power supply to avoid excessive heating in the multiparameter light.

16. The multiparameter light of claim 1 wherein the control system comprises a logic circuit having an input coupled to the orientation sensor and an output coupled to the control input of the variable power supply.

17. The multiparameter light of claim 1 further comprising a convection cooling system.

18. The multiparameter light of claim 1 further comprising a forced air cooling system having a fan.

19. The multiparameter light of claim 1 wherein:

the variable power supply is contained in the housing; and the orientation sensor is mounted within the housing.

20. The multiparameter light of claim 1 comprising an additional housing, wherein:

the variable power supply is contained in the additional housing; and the orientation sensor is mounted within the housing.

21. The multiparameter light of claim 1 comprising an additional housing, wherein:

the variable power supply is contained in the additional housing; and the orientation sensor is mounted within the additional housing.

22. A theatre lighting device comprising:

a housing;

a variable power supply having an output and a control input;

a lamp contained at least in part within the housing and coupled to the output of the variable power supply;

a shutter disposed in the housing [alone] *along* a light path from the lamp;

a component for a variable parameter, other than a dimming parameter, that affects light exiting the theatre lighting device when the shutter is not closed; and a control system having an output coupled to the component, an output coupled to the input of the variable power supply, and means for setting the variable power supply to vary power to the lamp in response to variation in the variable parameter, independently of any remote command.

23. The theatre lighting device of claim 22 wherein the component is a zoom lens.

24. The theatre lighting device of claim 22 wherein the component is a projection pattern.

25. The theatre lighting device of claim 22 wherein the component is a focusing lens.

26. The theatre lighting device of claim 22 wherein the component is a color filter.

27. The theatre lighting device of claim 22 wherein the control system further comprises an input for receiving commands, including a first command to vary the variable parameter, the control system being responsive to the first command for varying the variable parameter and for varying power to the lamp.

28. The theatre lighting device of claim 22 wherein the component comprises a stepper motor, the control system being responsive to operating signals for the stepper motor for setting the variable power supply to vary power to the lamp.

29. The theatre lighting device of claim 22 further comprising a sensor for the variable parameter, the control system having an input coupled to the sensor and being responsive thereto for setting the variable power supply to vary power to the lamp.

30. The theatre lighting device of claim 29 wherein the sensor is mounted in proximity to the component.

31. The [multiparameter light] *theatre lighting device* of claim 22 wherein the setting means is for varying power to the lamp to avoid excessive heating in the theatre lighting device.

32. A theatre lighting device having a lamp orientation that is variable in accordance with an orientation parameter comprising:

a housing;

a variable power supply having an output and a control input;

a lamp contained at least in part within the housing and coupled to the output of the variable power supply;

at least one orientation parameter component for varying the lamp orientation coupled to the housing; and a control system having an output coupled to the orientation parameter component, an output coupled to the input of the variable power supply, and means for setting the variable power supply to vary power to the lamp in response to variation in the orientation parameter.

33. The theatre lighting device of claim 32 wherein the control system further comprises an input for receiving commands, including a first command to vary the orientation parameter, the control system being responsive to the first command for varying the orientation parameter and for varying power to the lamp.

34. The theatre lighting device of claim 32 wherein the orientation parameter component comprises a stepper motor, the control system being responsive to operating signals for the stepper motor for setting the variable power supply to vary power to the lamp.

35. The theatre lighting device of claim 32 further comprising a sensor for the orientation parameter, the control system having an input coupled to the sensor and being responsive thereto for setting the variable power supply to vary power to the lamp.

36. The [multiparameter light] *theatre lighting device* of claim 32 wherein the setting means is for varying power to the lamp to avoid excessive heating in the theatre lighting device.

37. A multiparameter light comprising:

[housing means;]

[light source means contained at least in part within the housing means;]

*a light source;* means for applying power to the light source[means];

*means for housing, at least in part, the light source;* means responsive to a light makeup parameter command for activating a light makeup parameter of the multiparameter light; and means for adjusting power to the light source [means] in accordance with the light makeup parameter to avoid excessive heating in the multiparameter light.

38. The multiparameter light of claim 37 wherein the [component] *light makeup parameter* is a lamp *power scheme parameter*.

39. The multiparameter light of claim 37 wherein the [component] *light makeup parameter* is a projection pattern *parameter*.

40. The multiparameter light of claim 37 wherein the [component] *light makeup parameter* is an electronically variable aperture *parameter*.

41. The multiparameter light of claim 37 wherein the [component] *light makeup parameter* is a color filter *parameter*.

42. The multiparameter light of claim 37 wherein the power adjusting means comprises means for directly setting a level of power to the light source means in accordance with the light makeup parameter to avoid excessive heating in the multiparameter light.

43. The multiparameter light of claim 37 wherein the power adjusting means comprises:

means for generating a lamp power adjustment factor in accordance with the light makeup parameter; and means responsive to the lamp power adjustment factor for modifying [the] *a* lamp power scheme to avoid excessive heating in the multiparameter light.

44. A multiparameter light comprising:

[housing means;]

[light source means contained at least in part within the housing means;]

*a light source;* means for applying power to the light source[means];

*means for housing, at least in part, the light source;* means responsive to an orientation parameter command for activating an orientation parameter of the multiparameter light to place the multiparameter light in a new orientation; and means for adjusting power to the light source [means] in accordance with the orientation parameter to avoid excessive heating in the multiparameter light.

45. The multiparameter light of claim 44 [wherein the component] *further comprising:*

*means responsive to a light makeup parameter command for activating a light makeup parameter of the multiparameter light; and*

*means for adjusting power to the light source in accordance with the light makeup parameter to avoid excessive heating in the multiparameter light;*

*wherein the light makeup parameter* is a lamp *power scheme parameter*.

46. The multiparameter light of claim 44 [wherein the component] *further comprising:*

*means responsive to a light makeup parameter command for activating a light makeup parameter of the multiparameter light; and*

*means for adjusting power to the light source in accordance with the light makeup parameter to avoid excessive heating in the multiparameter light;*

*wherein the light makeup parameter* is a projection pattern *parameter*.

47. The multiparameter light of claim 44 [wherein the component] *further comprising:*

*means responsive to a light makeup parameter command for activating a light makeup parameter of the multiparameter light; and*

*means for adjusting power to the light source in accordance with the light makeup parameter to avoid excessive heating in the multiparameter light;*

*wherein the light makeup parameter* is an electronically variable aperture *parameter*.

48. The multiparameter light of claim 44 [wherein the component] *further comprising:*

*means responsive to a light makeup parameter command for activating a light makeup parameter of the multiparameter light; and*

*means for adjusting power to the light source in accordance with the light makeup parameter to avoid excessive heating in the multiparameter light;*

*wherein the light makeup parameter* is a color filter *parameter*.

49. The multiparameter light of claim 44 wherein the power adjusting means comprises means for directly setting a level of power to the light source [means] in accordance with the orientation parameter to avoid excessive heating in the multiparameter light.

50. The multiparameter light of claim 44 wherein the power adjusting means comprises:

means for generating a lamp power adjustment factor in accordance with the orientation parameter; and means responsive to the lamp power adjustment factor for modifying [the] *a* lamp power scheme to avoid excessive heating in the multiparameter light.

51. The multiparameter light of claim 44 wherein the power adjusting means comprises means responsive to the orientation parameter command for adjusting power to the light source means to avoid excessive heating in the multiparameter light.

52. The multiparameter light of claim 44 wherein the power adjusting means comprises means responsive to the new orientation of the multiparameter light for adjusting power to the light source means to avoid excessive heating in the multiparameter light.

53. A method of operating a multiparameter light comprising a lamp, a housing for the lamp, and a light makeup parameter, the method comprising:

applying power to the lamp;

activating the light makeup parameter in response to a light makeup parameter command; and adjusting the power to the lamp in accordance with the light makeup parameter to avoid excessive heating [of] in the multiparameter light.

54. The [multiparameter light] *method* of claim 53 wherein the [component] *light makeup parameter* is a lamp *power scheme parameter*.

55. The [multiparameter light] *method* of claim 53 wherein the [component] *light makeup parameter* is a projection pattern *parameter*.

56. The [multiparameter light] *method* of claim 53 wherein the [component] *light makeup parameter* is an electronically variable aperture *parameter*.

57. The [multiparameter light] *method* of claim 53 wherein the [component] *light makeup parameter* is a color filter *parameter*.

58. The method of claim 53 wherein the power applying step comprises applying power to the lamp in accordance with a lamp power scheme, and wherein the power adjusting step comprises:

generating a lamp power adjustment factor in accordance with the light makeup parameter; and modifying the lamp power scheme in accordance with the lamp power adjustment factor to avoid excessive heating in the multiparameter light.

59. The method of claim 53 wherein the power adjusting step comprises directly setting a level of power to the lamp in accordance with the light makeup parameter to avoid excessive heating in the multiparameter light.

60. The method of claim 53 wherein the power adjusting step comprises adjusting power to the lamp in response to the light makeup parameter command to avoid excessive heating in the multiparameter light.

61. The method of claim 53 wherein the power adjusting step comprises adjusting power to the lamp in response to a sensed condition of the light makeup parameter to avoid excessive heating in the multiparameter light.

62. The method of claim 53 wherein the multiparameter light further comprises an orientation parameter, the method further comprising:

activating the orientation parameter in response to an orientation parameter command to place the multiparameter light in a new orientation; and additionally adjusting the power to the lamp in accordance with the orientation parameter to avoid excessive heating in the multiparameter light.

63. The [multiparameter light] *method* of claim 62 wherein the [component] *light makeup parameter* is a lamp *power scheme parameter*.

64. The [multiparameter light] *method* of claim 62 wherein the [component] *light makeup parameter* is a projection pattern *parameter*.

65. The [multiparameter light] *method* of claim 62 wherein the [component] *light makeup parameter* is an electronically variable aperture *parameter*.

66. The [multiparameter light] *method* of claim 62 wherein the [component] *light makeup parameter* is a color filter *parameter*.

67. The method of claim 62 wherein the power applying step comprises applying power to the lamp in accordance with a lamp power scheme, and wherein the additional power adjusting step comprises:

generating an additional lamp power adjustment factor in accordance with the orientation parameter; and modifying the lamp power scheme in accordance with the additional lamp power adjustment factor to avoid excessive heating in the multiparameter light.

68. The method of claim 62 wherein the additional power adjusting step comprises directly setting a level of power to the lamp in accordance with the orientation parameter to avoid excessive heating in the multiparameter light.

69. The method of claim 62 wherein the additional power adjusting step comprises adjusting power to the lamp in response to the orientation parameter command to avoid excessive heating in the multiparameter light.

70. The method of claim 62 wherein the additional power adjusting step comprises adjusting power to the lamp in response to the new orientation to avoid excessive heating in the multiparameter light.

71. A method of operating a multiparameter light comprising a lamp, a housing for the lamp, and an orientation parameter, the method comprising:

applying power to the lamp;

activating the orientation parameter in response to an orientation parameter command to place the multiparameter light in a new orientation; and adjusting the power to the lamp in accordance with the orientation parameter to avoid excessive heating in the multiparameter light.

72. The method of claim 71 wherein the power applying step comprises applying power to the lamp in accordance with a lamp power scheme, and wherein the additional power adjusting step comprises:

generating an additional lamp power adjustment factor in accordance with the orientation parameter; and modifying the lamp power scheme in accordance with the additional lamp power adjustment factor to avoid excessive heating in the multiparameter light.

73. The method of claim 71 wherein the power adjusting step comprises directly setting a level of power to the lamp in accordance with the orientation parameter to avoid excessive heating in the multiparameter light.

74. The method of claim 71 wherein the power adjusting step comprises adjusting power to the lamp in response to the orientation parameter command to avoid excessive heating in the multiparameter light.

75. The method of claim 71 wherein the power adjusting step comprises adjusting power to the lamp in response to the new orientation to avoid excessive heating in the multiparameter light.

76. A method of controlling operating temperature [of] *in* a multiparameter light responsive to parameter commands[, or a component thereof,] and comprising a housing and a lamp contained at least in part within the housing, the method comprising:

applying power to the lamp;

establishing an orientation of the multiparameter light, wherein projected light from the multiparameter light is directed to a desired location external of the multiparameter light; and adjusting the power to the lamp in accordance with the orientation to avoid excessive heating in the multiparameter light.

77. The multiparameter light of claim [76] *84* wherein the [component] *light makeup parameter* is a lamp *power scheme parameter*.

78. The multiparameter light of claim [76] *84* wherein the [component] *light makeup parameter* is a projection pattern *parameter*.

79. The multiparameter light of claim [76] *84* wherein the [component] *light makeup parameter* is an electronically variable aperture *parameter*.

80. The multiparameter light of claim [76] *84* wherein the [component] *light makeup parameter* is a color filter *parameter*.

81. The method of claim 76 wherein the multiparameter light further comprises an orientation parameter, the method further comprising:

activating the orientation parameter in response to an orientation parameter command to place the multiparameter light in a new orientation; and additionally adjusting the power to the lamp in accordance with the orientation parameter to avoid excessive heating in the multiparameter light.

82. The method of claim 81 wherein the additional power adjusting step comprises adjusting power to the lamp in response to the orientation parameter command to avoid excessive heating [of] in the multiparameter light.

83. The method of claim 81 wherein the additional power adjusting step comprises adjusting power to the lamp in response to the new orientation to avoid excessive heating in the multiparameter light.

84. The method of claim 76 wherein the multiparameter light further comprises a light makeup parameter, the method further comprising:

activating the light makeup parameter in response to a light makeup parameter command; and additionally adjusting the power to the lamp in accordance with the light makeup parameter to avoid excessive heating in the multiparameter light.

85. The method of claim 84 wherein the additional power adjusting step comprises adjusting power to the lamp in response to the light makeup parameter command to avoid excessive heating in the multiparameter light[or at least one component thereof].

86. The method of claim 84 wherein the additional power adjusting step comprises adjusting power to the lamp in response to a sensed condition of the light makeup parameter to avoid excessive heating in the multiparameter light.

87. A multiparameter light comprising:

a housing;

a lamp contained at least in part within the housing;

a shutter contained at least in part within the housing and disposed in a light path, *wherein* the shutter [being capable of] *is configured for transmitting* different amounts of light[transmission];

an orientation sensor having a determinable relationship with the [multiparameter light] *shutter*; and a control system having an input for receiving commands, an input coupled to the orientation sensor, and an output coupled to the shutter.

88. The multiparameter light of claim 87 wherein the orientation sensor comprises an angle of inclination sensor.

89. The multiparameter light of claim 87 wherein the control system comprises:

a microprocessor coupled to the shutter;

a sensor interface having an input coupled to the orientation sensor and an output coupled to the microprocessor; and operational codes for setting the shutter to an amount of light transmission under microprocessor control in response to the orientation sensor to avoid excessive heating in the multiparameter light.

90. The multiparameter light of claim 89 [wherein the component is] *further comprising means for implementing* a lamp *power scheme parameter*.

91. The multiparameter light of claim 89 [wherein the component is] *further comprising means for implementing* a projection pattern *parameter*.

92. The multiparameter light of claim 89 [wherein the component is] *further comprising means for implementing* an electronically variable aperture *parameter*.

93. The multiparameter light of claim 89 [wherein the component is] *further comprising means for implementing* a color filter *parameter*.

94. A theatre lighting device [multiparameter light] comprising:

a housing;

a lamp contained at least in part within the housing;

a shutter contained at least in part within the housing and disposed in a light path, *wherein* the shutter [being capable of] *is configured for transmitting* different amounts of light[transmission];

a component for a variable parameter, other than a dimming parameter, that affects light exiting the theatre lighting device when the shutter is not closed; and a control system having an output coupled to the [light makeup parameter] component, an output coupled to the shutter, and means for setting the shutter to an amount of light transmission in response to variation in the variable parameter, independently of any remote command.

95. The theatre lighting device of claim 94 wherein the component is a zoom lens.

96. The theatre lighting device of claim 94 wherein the component is a projection pattern.

97. The theatre lighting device of claim 94 wherein the component is a focusing lens.

98. The theatre lighting device of claim 94 wherein the component is a color filter.

99. The theatre lighting device of claim 94 wherein the control system further comprises an input for receiving commands, the shutter setting means being responsive to a light makeup parameter command at the command input.

100. The theatre lighting device of claim 99 wherein the shutter setting means comprises:

a microprocessor coupled to the shutter; and operational codes for setting the amount of light transmission of the shutter under microprocessor control in response to the light makeup parameter command to avoid excessive heating [of] in the multiparameter light.

101. The theatre lighting device of claim 94 wherein the light makeup parameter component comprises a stepper motor, the shutter setting means being responsive to operating signals for the stepper motor.

102. The theatre lighting device of claim 101 wherein the shutter setting means comprises:

a microprocessor coupled to the shutter; and operational codes for setting the amount of light transmission of the shutter under microprocessor control in response to the operating signals for the stepper motor to avoid excessive heating [of] in the multiparameter light.

103. The [multiparameter light] *theatre lighting device* of claim 94 wherein the shutter setting means is for varying power to the lamp to avoid excessive heating in the theatre lighting device.

104. A multiparameter light comprising:

a housing;

a lamp contained at least in part within the housing;

a shutter contained at least in part within the housing and disposed in a light path, *wherein* the shutter [being capable of] *is configured for transmitting* different amounts of light[transmission];

at least one orientation parameter component coupled to the housing; and a control system having an output coupled to the orientation parameter component, an output coupled to the shutter, and means for setting the shutter to an amount of light transmission in accordance with an orientation parameter to avoid excessive heating of the multiparameter light or at least one component thereof.

105. The multiparameter light of claim 104 wherein the component is a [lamp] *lens*.

106. The multiparameter light of claim 104 wherein the component is a projection pattern.

107. The multiparameter light of claim 104 wherein the component is an electronically variable aperture.

108. The multiparameter light of claim 104 wherein the component is a color filter.

109. The multiparameter light of claim 104 wherein the control system further comprises an input for receiving commands, the shutter setting means being responsive to an orientation parameter command at the command input.

110. The multiparameter light of claim 109 wherein the shutter setting means comprises:

a microprocessor coupled to the shutter; and operational codes for setting the amount of light transmission of the shutter under microprocessor control in response to the orientation parameter command to avoid excessive heating in the multiparameter light.

111. The multiparameter light of claim 104 wherein the orientation parameter component comprises a stepper motor, the shutter setting means being responsive to operating signals for the stepper motor.

112. The multiparameter light of claim 111 wherein the shutter setting means comprises:

a microprocessor coupled to the shutter; and operational codes for setting the amount of light transmission of the shutter under microprocessor control in response to the operating signals for the stepper motor to avoid excessive heating in the multiparameter light.

113. A method of operating a multiparameter light comprising a lamp, a housing for the lamp, a shutter in [the] *a* light beam *from the lamp*, and a light makeup parameter, [the method] comprising:

applying power to the lamp;

activating the light makeup parameter in response to a light makeup parameter command; and setting the shutter to an amount of light transmission in accordance with the light makeup parameter to avoid excessive heating in the multiparameter light.

114. The [multiparameter light] *method* of claim 113 wherein the [component] *light makeup parameter* is a lamp *power scheme parameter*.

115. The [multiparameter light] *method* of claim 113 wherein the [component] *light makeup parameter* is a projection pattern *parameter*.

116. The [multiparameter light] *method* of claim 113 wherein the [component] *light makeup parameter* is an electronically variable aperture *parameter*.

117. The [multiparameter light] *method* of claim 113 wherein the [component] *light makeup parameter* is a color filter *parameter*.

118. The method of claim 113 wherein the multiparameter light further comprises an orientation parameter, the method further comprising:

activating the orientation parameter in response to an orientation parameter command to place the multiparameter light in a new orientation; and setting the shutter to an amount of light transmission in accordance with the orientation parameter to avoid excessive heating in the multiparameter light.

119. A method of operating a multiparameter light comprising a lamp, a housing for the lamp, a shutter in [the] *a* light beam *from the lamp*, and an orientation parameter, [the method] comprising:

applying power to the lamp;

activating the orientation parameter in response to an orientation parameter command to place the multiparameter light in a new orientation; and setting the shutter to an amount of light transmission in accordance with the orientation parameter to avoid excessive heating in the multiparameter light.

120. A method of controlling operating temperature of a multiparameter light responsive to parameter commands, or a component thereof, and comprising a housing, a lamp contained at least in part within the housing, and a shutter in a light beam from the lamp, [the method] comprising:

applying power to the lamp;

establishing an orientation of the multiparameter light, wherein projected light from the multiparameter light is directed to a desired location external of the multiparameter light; and setting the shutter to an amount of light transmission in accordance with the orientation to avoid excessive heating in the multiparameter light.

121. The method of claim 120 wherein the multiparameter light further comprises an orientation parameter, the method further comprising:

activating the orientation parameter in response to an orientation parameter command to place the multiparameter light in a new orientation; and additionally setting the shutter to an amount of light transmission in accordance with the orientation parameter to avoid excessive heating in the multiparameter light.

*122. A multiparameter light comprising:*

*a housing;*

*a lamp contained at least in part within the housing for providing light over a light path;*

*a shutter contained at least in part within the housing and disposed in the light path;*

*an orientation sensor having a functional relationship with the shutter; and*

*a control system having an input coupled to the orientation sensor, and an output coupled to the shutter.*

*123. The multiparameter light of claim 122 further comprising a communications node for receiving commands, the communications node being coupled to the control system.*

*124. The multiparameter light of claim 122 further comprising a yoke, wherein:*

*the housing comprises a lamp housing and a base housing, the lamp being contained at least in part within the lamp housing for providing light over the light path, and the lamp housing being coupled to the base housing by the yoke for remotely positioning the lamp housing in relation to the base housing; and*

*the shutter is contained at least in part within the lamp housing and comprises an electronically variable aperture.*

*125. The multiparameter light of claim 124 wherein the electronically variable aperture is a liquid crystal type.*

*126. The multiparameter light of claim 124 wherein the electronically variable aperture is a micromirror type.*

*127. The multiparameter light of claim 124 wherein the orientation sensor is mounted in the base housing.*

*128. The multiparameter light of claim 124 wherein the orientation sensor is mounted in the lamp housing.*

*129. The multiparameter light of claim 122 wherein the orientation sensor comprises an angle of inclination sensor.*

*130. The multiparameter light of claim 122 wherein the control system comprises:*

*a microprocessor coupled to the shutter; and*

*a sensor interface having an input coupled to the orientation sensor and an output coupled to the microprocessor.*

*131. The multiparameter light of claim 122 wherein the control system comprises means for controlling a light makeup parameter.*

*132. The multiparameter light of claim 131 wherein the light makeup parameter is a shutter parameter.*

* * * * *